United States Patent
Yang et al.

(10) Patent No.: US 11,071,045 B2
(45) Date of Patent: Jul. 20, 2021

(54) ELECTRONIC DEVICE, COMMUNICATION METHOD OF ELECTRONIC DEVICE, AND COMMUNICATION METHOD OF MOBILE TERMINAL

(71) Applicant: Samsung Electronics Co., Ltd., Suwon-si (KR)

(72) Inventors: Hee Kyung Yang, Suwon-si (KR); Hyun Cheol Oh, Suwon-si (KR); Ji-Hyouk Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 54 days.

(21) Appl. No.: 15/776,606

(22) PCT Filed: Dec. 8, 2016

(86) PCT No.: PCT/KR2016/014374
§ 371 (c)(1),
(2) Date: May 16, 2018

(87) PCT Pub. No.: WO2017/116034
PCT Pub. Date: Jul. 6, 2017

(65) Prior Publication Data
US 2018/0376410 A1    Dec. 27, 2018

(30) Foreign Application Priority Data

Dec. 28, 2015  (KR) ........................ 10-2015-0187065

(51) Int. Cl.
*G06F 7/04*     (2006.01)
*G06F 15/16*   (2006.01)
(Continued)

(52) U.S. Cl.
CPC ......... *H04W 48/14* (2013.01); *H04W 12/062* (2021.01); *H04W 48/16* (2013.01); *H04W 60/00* (2013.01); *H04W 84/12* (2013.01)

(58) Field of Classification Search
USPC .............................................. 726/3
See application file for complete search history.

(56) References Cited

U.S. PATENT DOCUMENTS 9,197,414 B1 * 11/2015 Martin .................. H04L 9/14
2010/0272081 A1 * 10/2010 Laroia .................. H04W 72/042
370/338

(Continued)

FOREIGN PATENT DOCUMENTS

JP    2007-257038 A    10/2007
JP    2008-219550 A     9/2008

(Continued)

OTHER PUBLICATIONS

European Search Report dated Sep. 28, 2018, issued in the European Application No. 16881986.0-1214/ 3364690.

(Continued)

*Primary Examiner* — Jeffrey C Pwu
*Assistant Examiner* — Samuel Ambaye
(74) *Attorney, Agent, or Firm* — Jefferson IP Law, LLP

(57) ABSTRACT

A communication method of an electronic device may comprise: a step of wirelessly outputting an advertisement signal at predetermined time intervals when power is supplied; a step of acquiring access information of an access repeater from an external device while outputting the advertisement signal; a step of stopping the output of the advertisement signal and accessing the access repeater on the basis of the access information of the access repeater when the access information of the access repeater is acquired; and a step of stopping the output of the advertisement signal if (Continued)

an elapsed time after the power is supplied is greater than a predetermined reference time.

9 Claims, 28 Drawing Sheets

(51) Int. Cl.
*H04L 29/06* (2006.01)
*H04W 48/14* (2009.01)
*H04W 48/16* (2009.01)
*H04W 60/00* (2009.01)
*H04W 84/12* (2009.01)
*H04W 12/062* (2021.01)

(56) References Cited

U.S. PATENT DOCUMENTS

| | | | | |
|---|---|---|---|---|
| 2011/0310812 A1* | 12/2011 | Gage | ............ | H04W 40/24 370/329 |
| 2011/0310813 A1* | 12/2011 | Gage | ............ | H04W 4/21 370/329 |
| 2011/0310864 A1* | 12/2011 | Gage | ............ | H04L 45/02 370/338 |
| 2012/0320273 A1* | 12/2012 | Toyoda | ............ | G06F 1/3265 348/569 |
| 2013/0016848 A1* | 1/2013 | Warren | ............ | H04R 27/00 381/77 |
| 2013/0046881 A1* | 2/2013 | Seelman | ............ | H04L 12/2809 709/224 |
| 2013/0173811 A1* | 7/2013 | Ha | ............ | H04L 12/2821 709/227 |
| 2014/0132081 A1* | 5/2014 | Lin | ............ | H03K 17/94 307/116 |
| 2014/0156081 A1* | 6/2014 | Ha | ............ | D06F 33/00 700/275 |
| 2015/0264650 A1* | 9/2015 | Sekine | ............ | H04W 52/0274 370/311 |
| 2016/0037566 A1* | 2/2016 | Jakusovszky | ............ | H04W 76/14 455/41.2 |
| 2016/0330101 A1* | 11/2016 | Gage | ............ | H04L 45/02 |
| 2016/0345317 A1* | 11/2016 | Levesque | ............ | H04W 40/12 |
| 2016/0373270 A1* | 12/2016 | Yang | ............ | H04W 12/06 |

FOREIGN PATENT DOCUMENTS

| | | |
|---|---|---|
| JP | 2009-38760 A | 2/2009 |
| JP | 2011-193051 A | 9/2011 |
| JP | 2014-17548 A | 1/2014 |
| JP | 2015-222964 A | 12/2015 |
| KR | 10-2013-0013238 A | 2/2013 |
| KR | 10-2013-0080487 A | 7/2013 |
| WO | 2014-178605 A1 | 11/2014 |
| WO | 2015-093906 A1 | 6/2015 |
| WO | 2015-119394 A1 | 8/2015 |

OTHER PUBLICATIONS

European Office Action dated Jan. 16, 2019; Reference #: JFW/87656EP1; Application #:/Patent #: 16881986.0-1214/ 3364690 PCT/KR2016014374.
European Office Action dated Jun. 19, 2019, issued in European Application No. 16 881 986.0-1214.
Chinese Office Action dated Jul. 3, 2020, issued in Chinese Patent Application No. 201680076146.1.
Japanese Office Action dated Feb. 2, 2021, issued in Japanese Patent Application No. 2018-526542 X.
Indian Office Action dated Feb. 24, 2021, issued in Indian Patent Application No. 201817028160.

* cited by examiner

[Fig. 1]
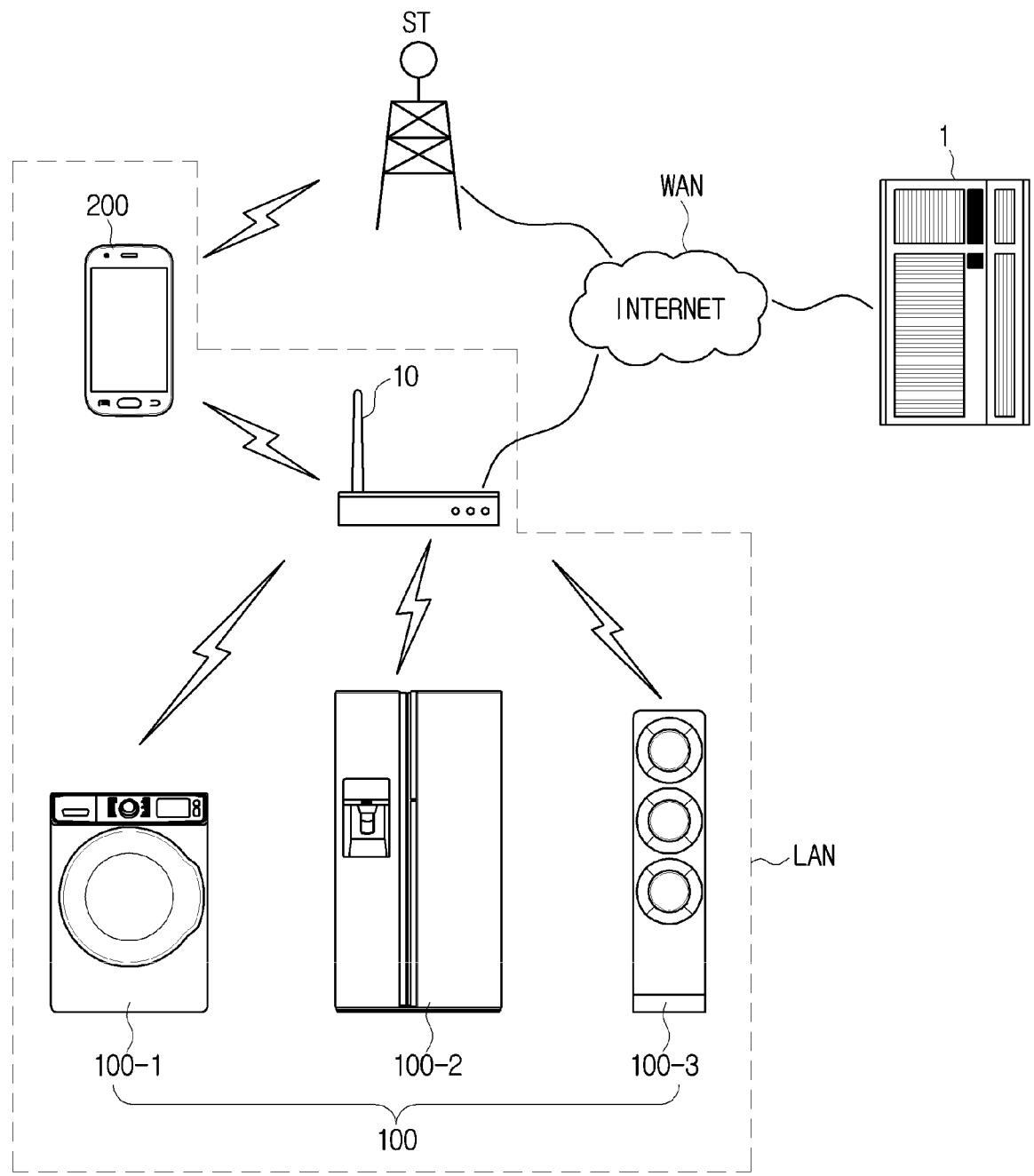

[Fig. 2]
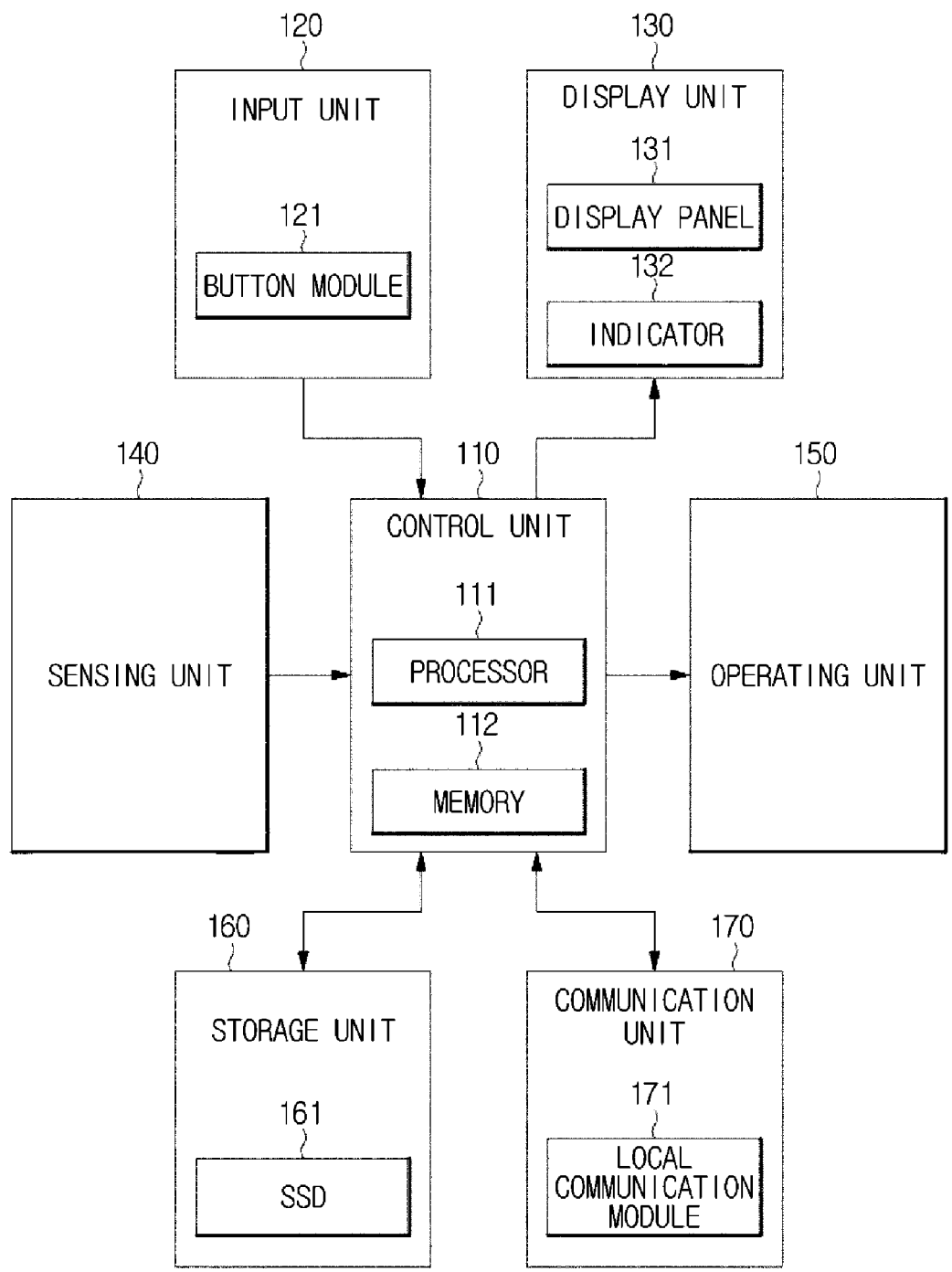

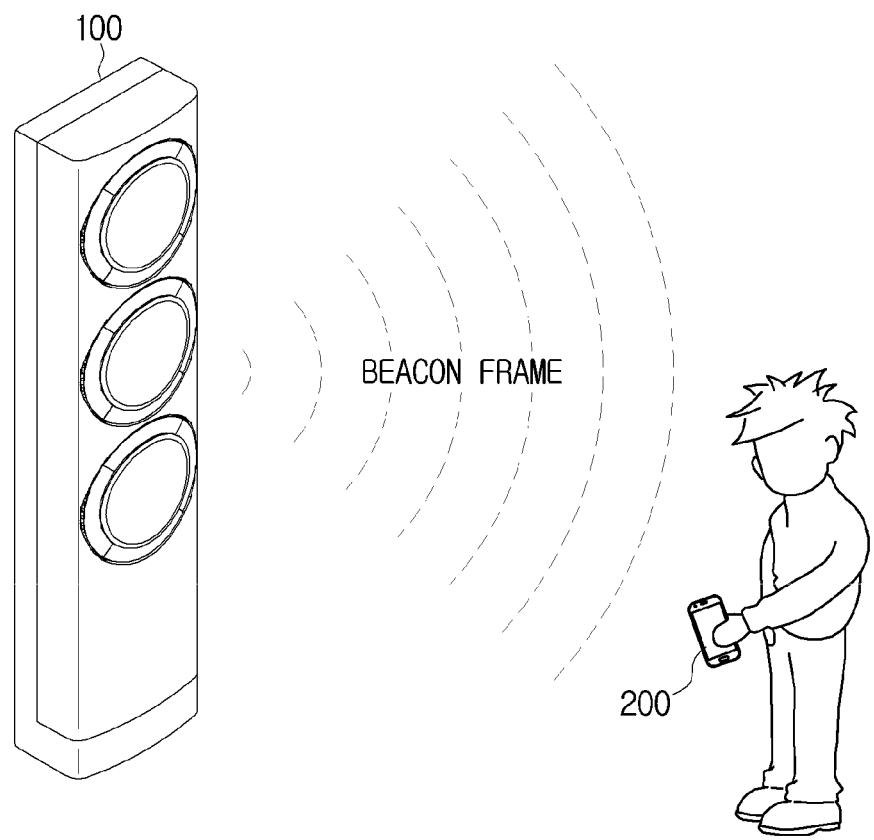
[Fig. 3]

[Fig. 4]
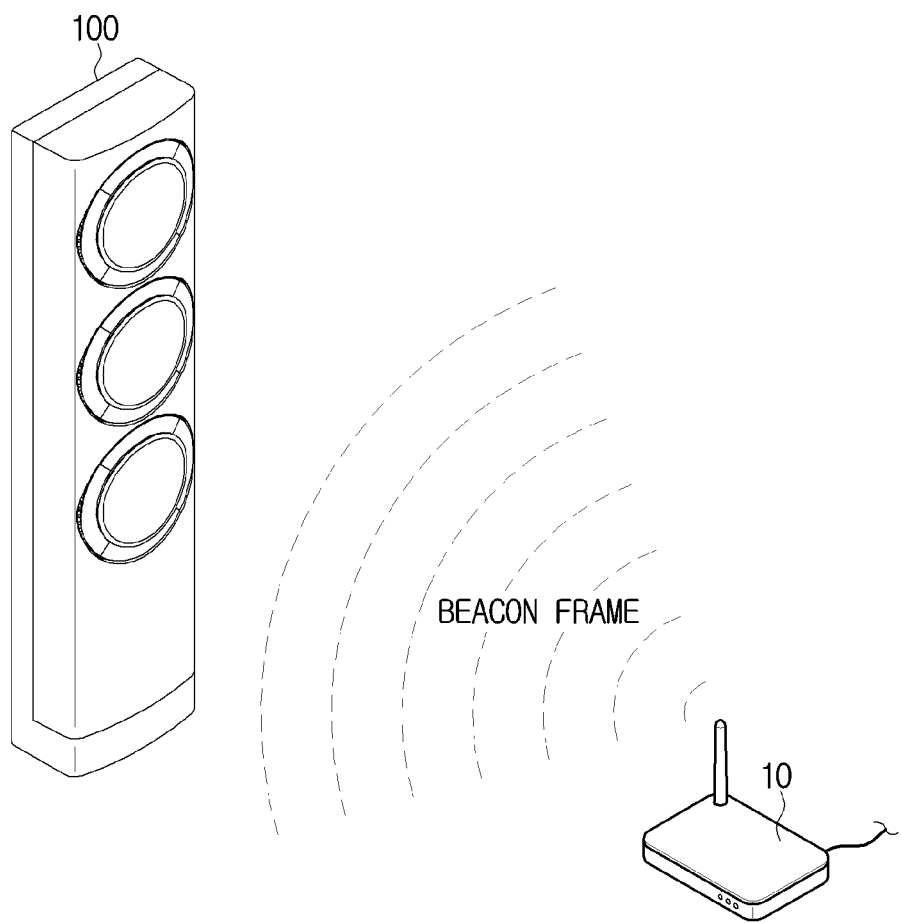

[Fig. 5a]
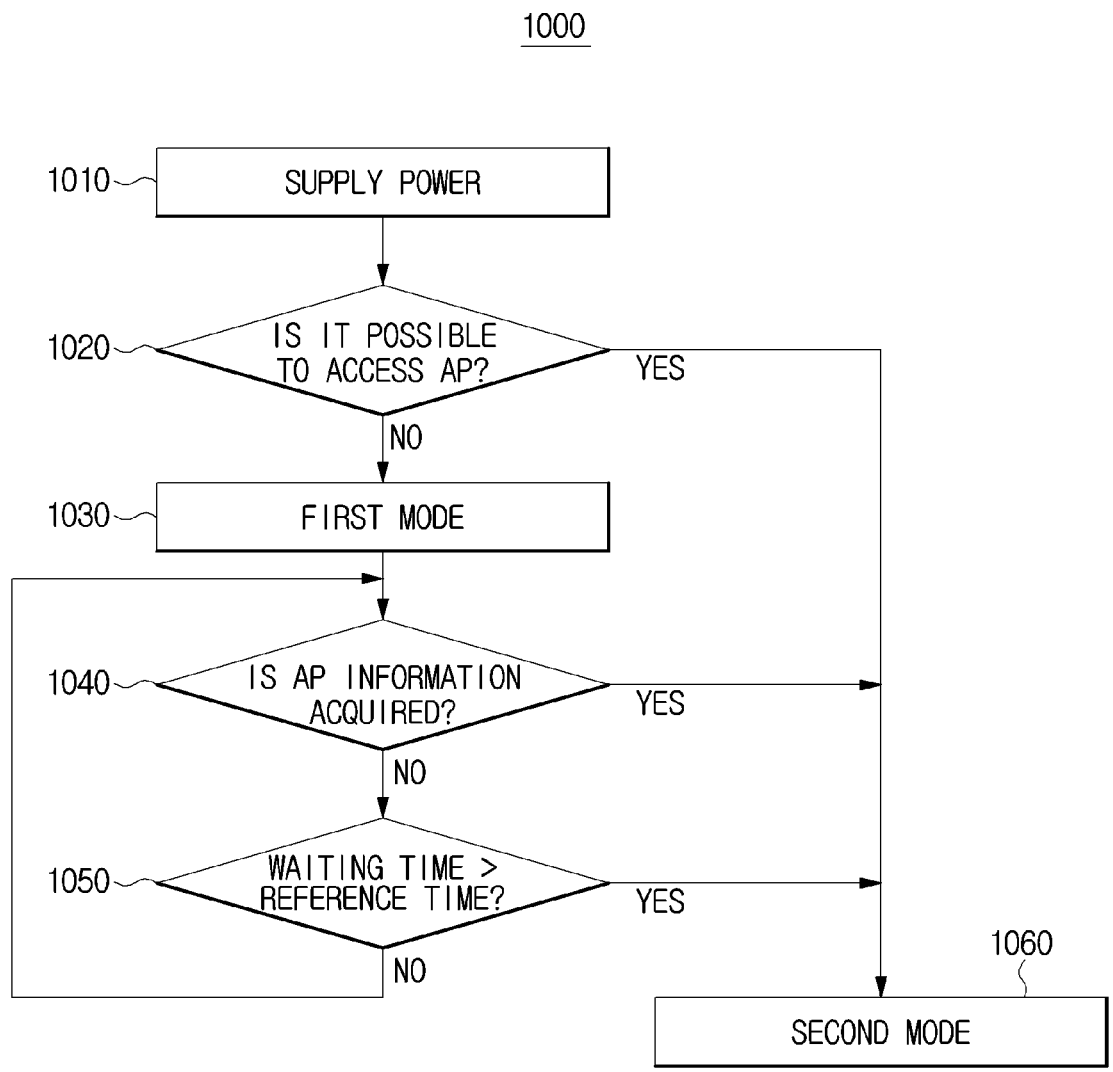

[Fig. 5b]
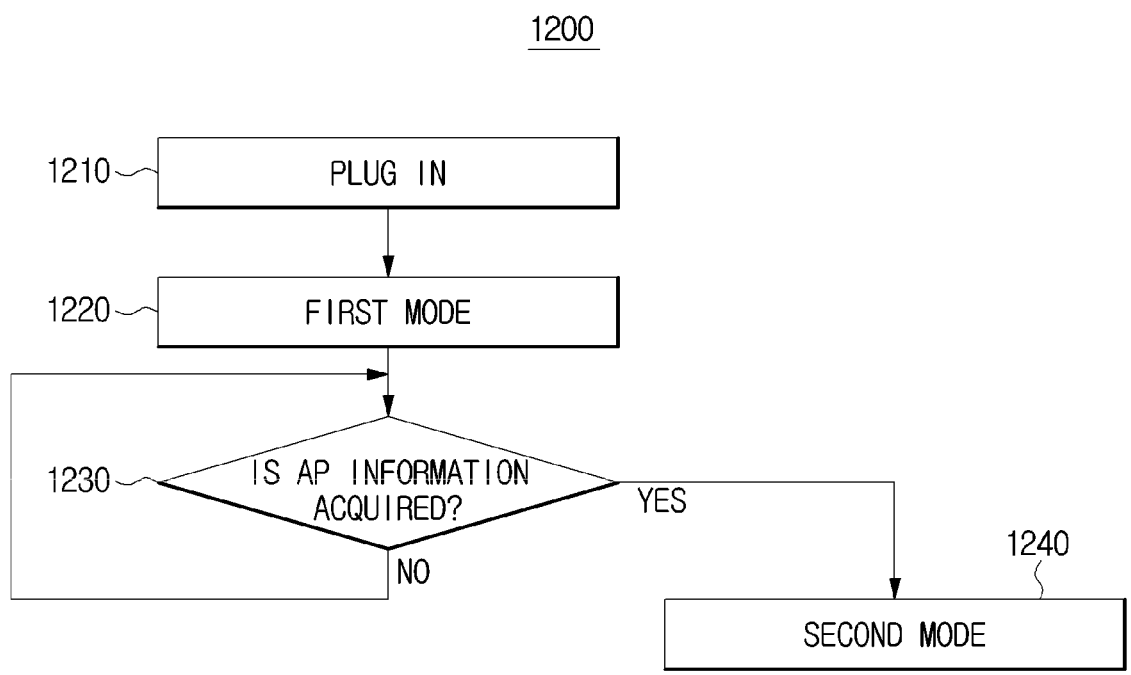

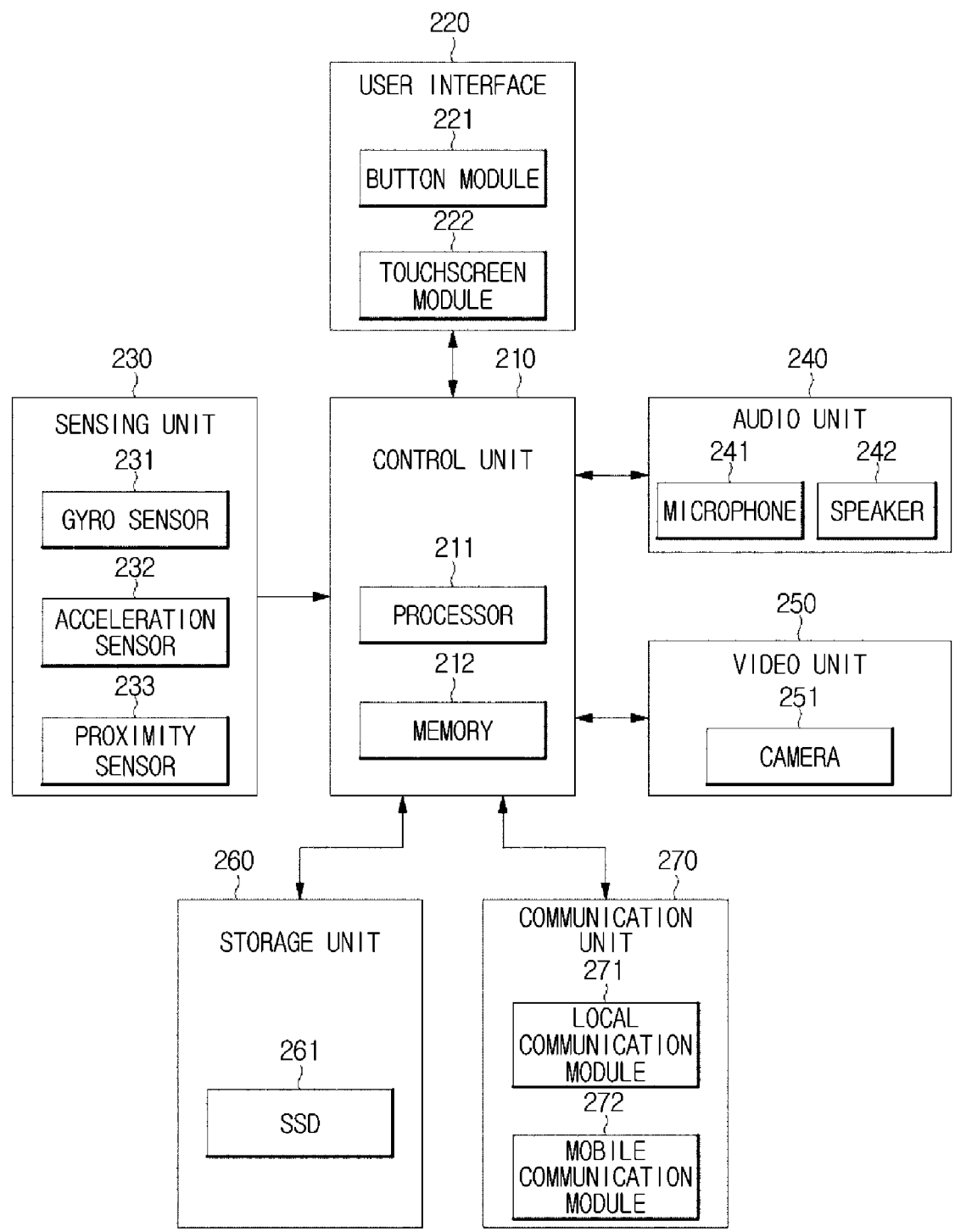
[Fig. 6]

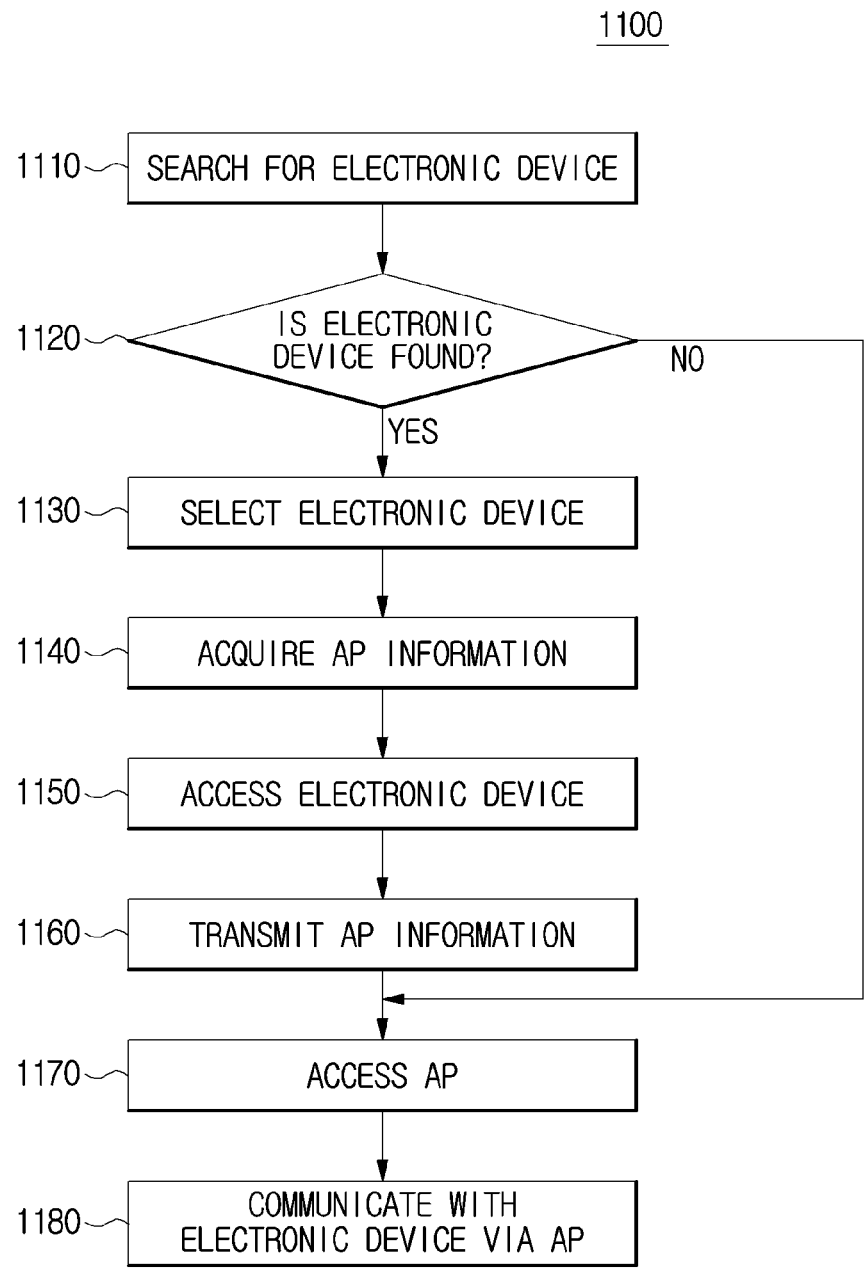

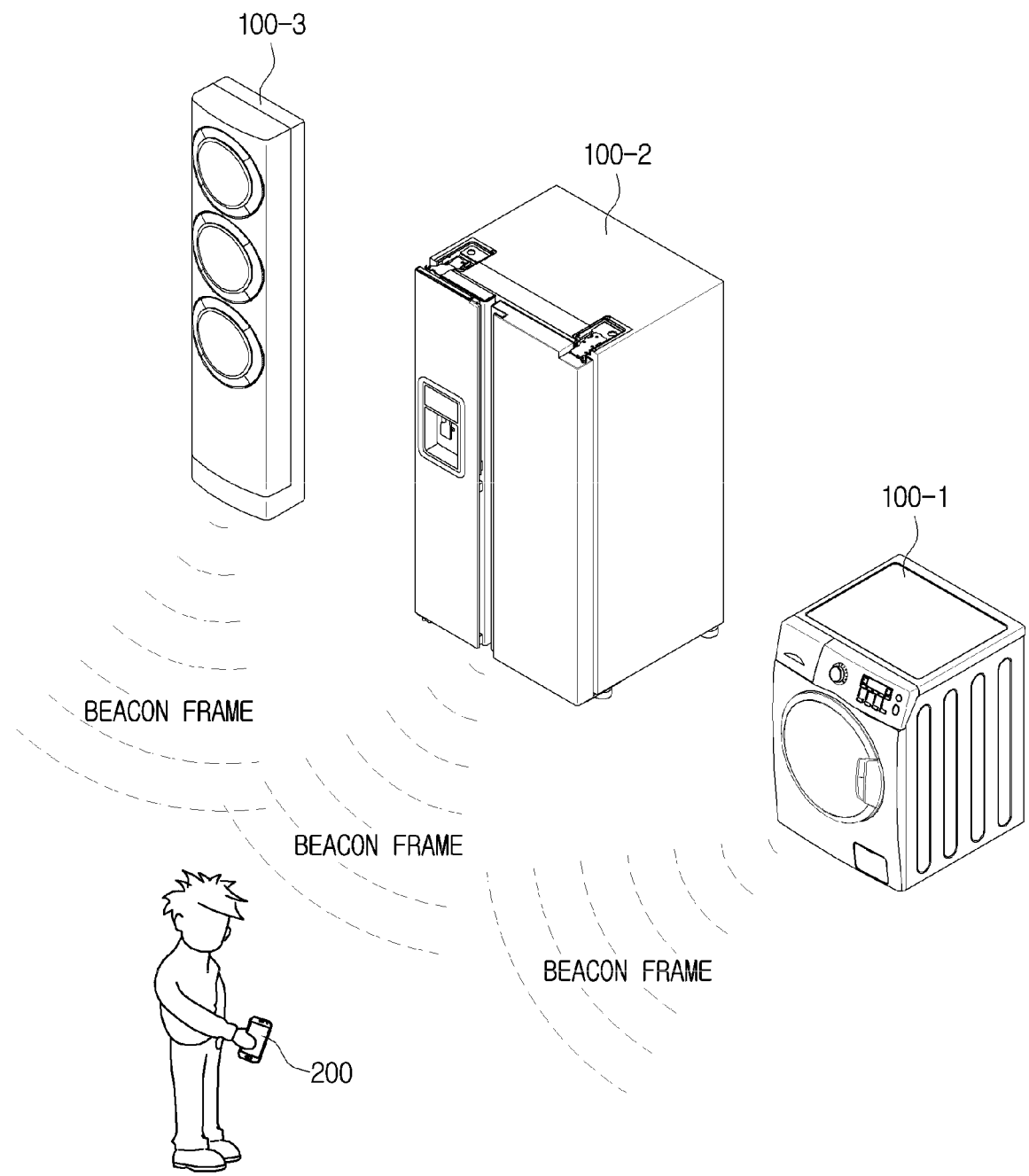
[Fig. 8]

[Fig. 9]
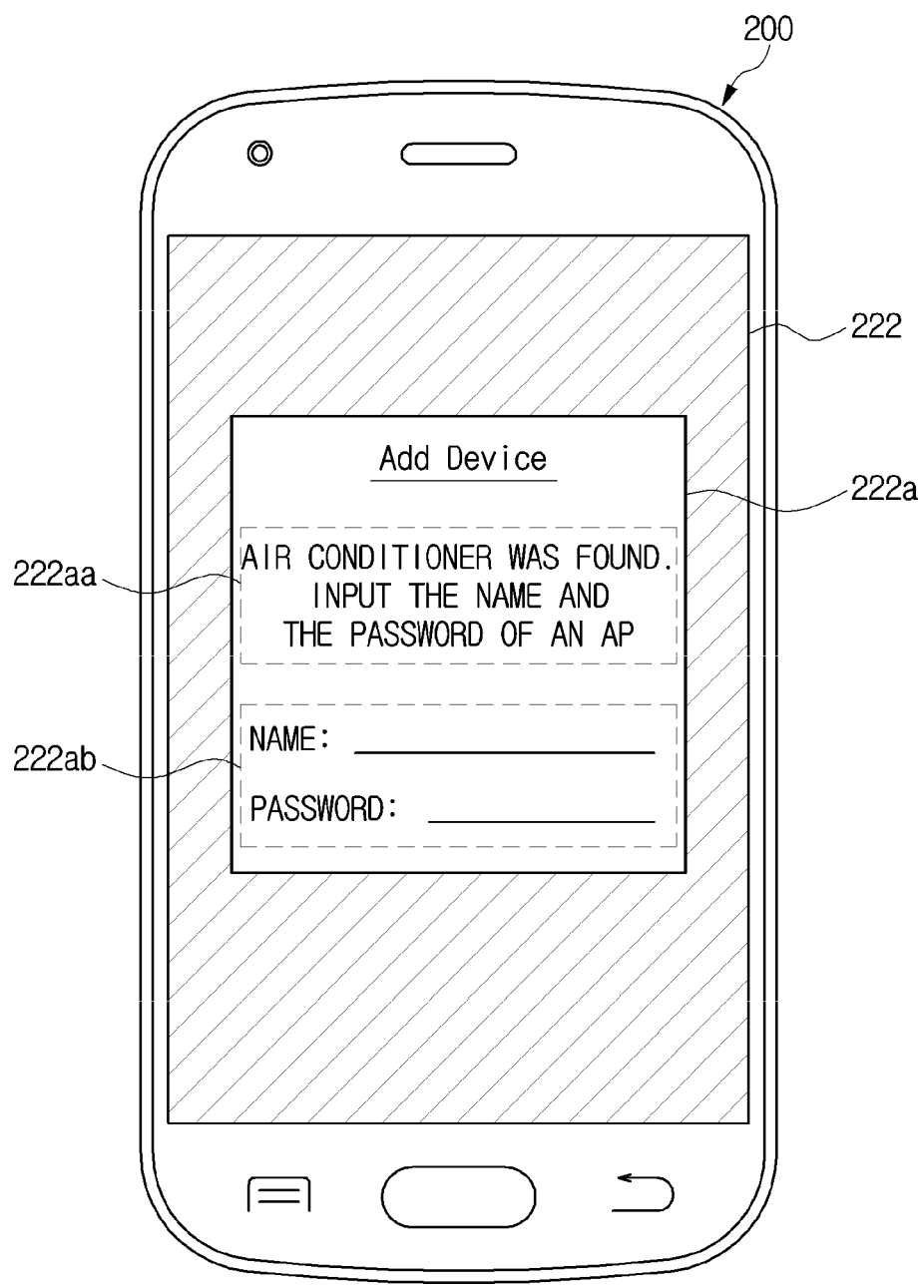

[Fig. 10]
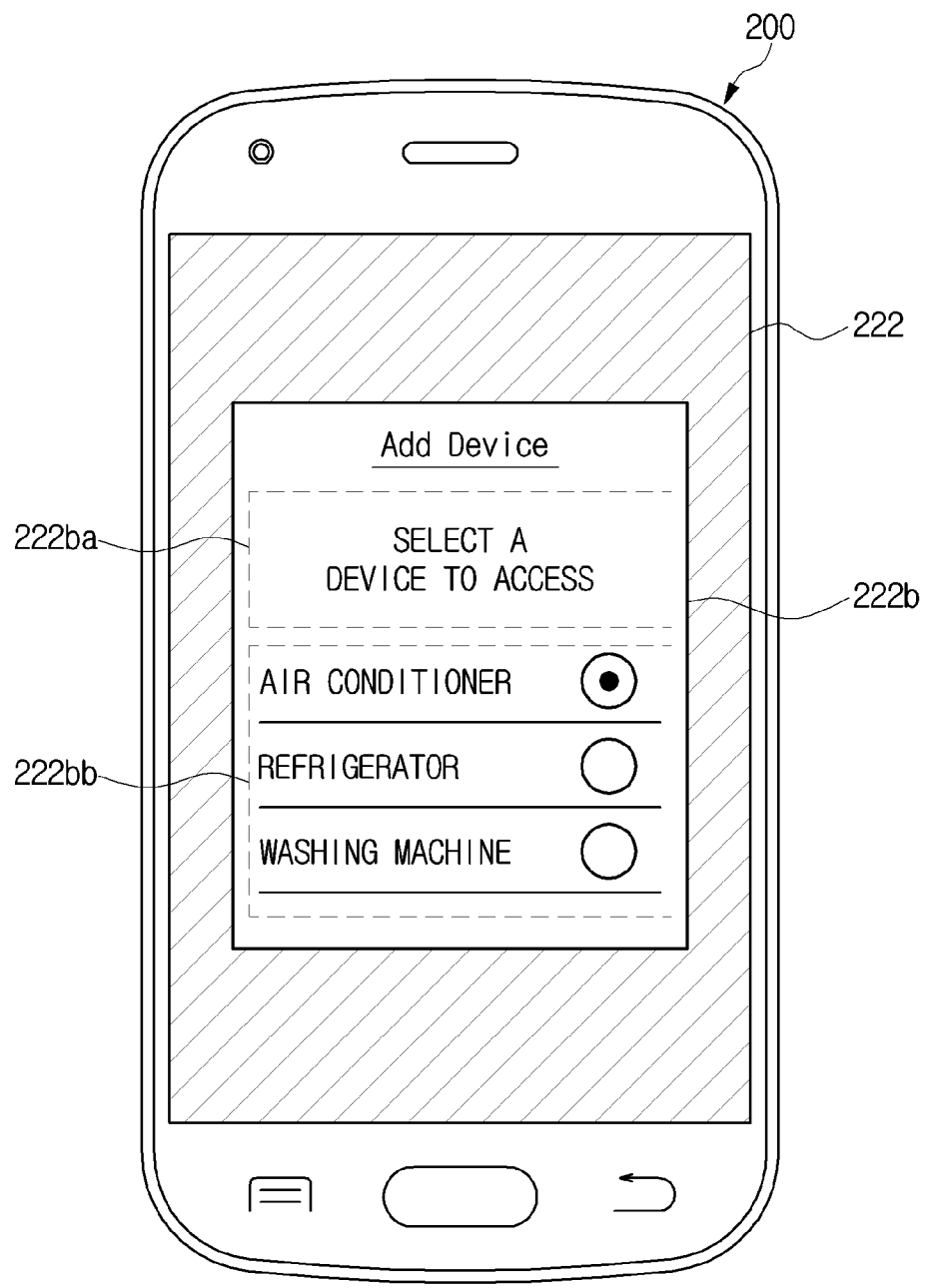

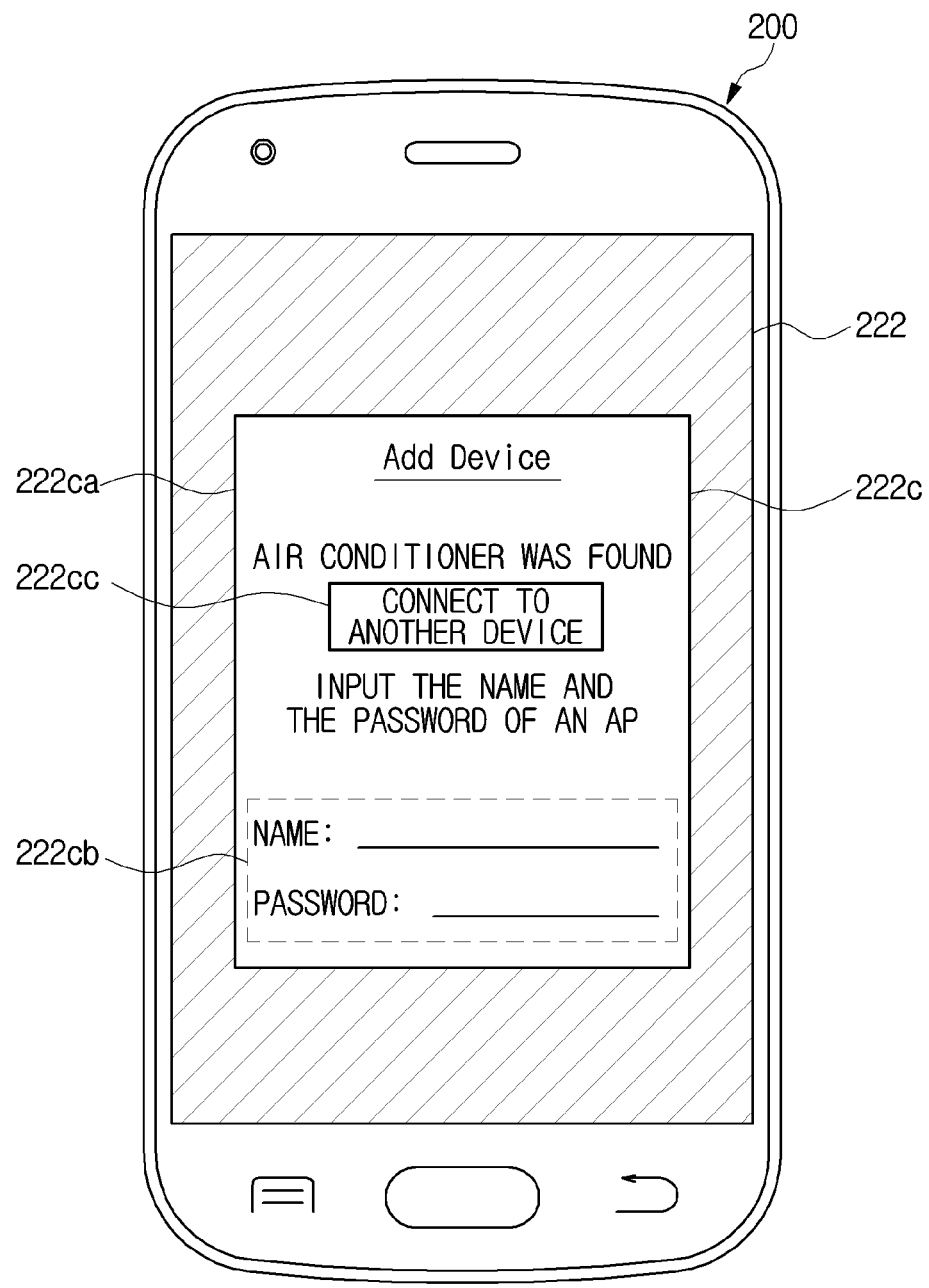
[Fig. 11]

[Fig. 12]
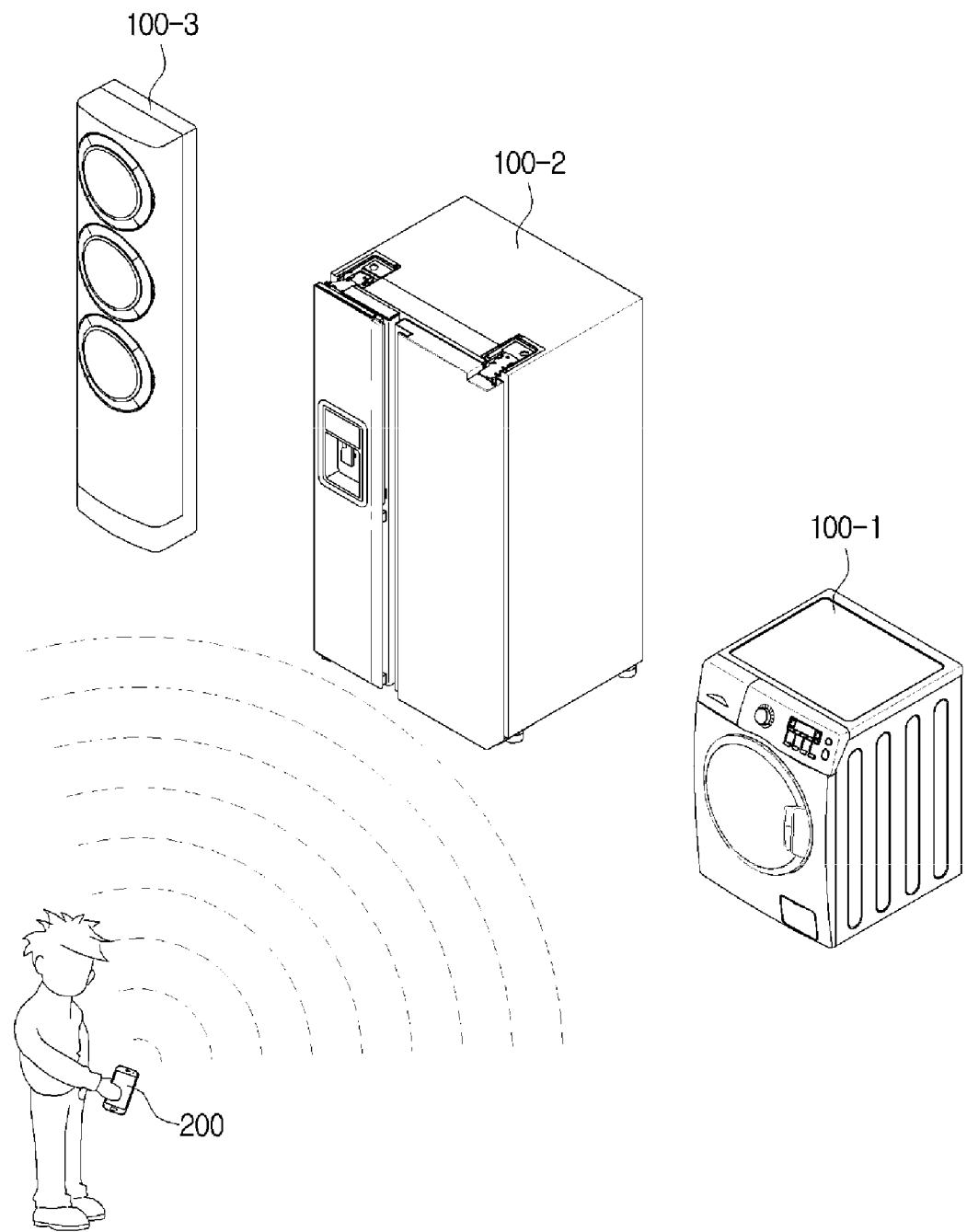

[Fig. 13]
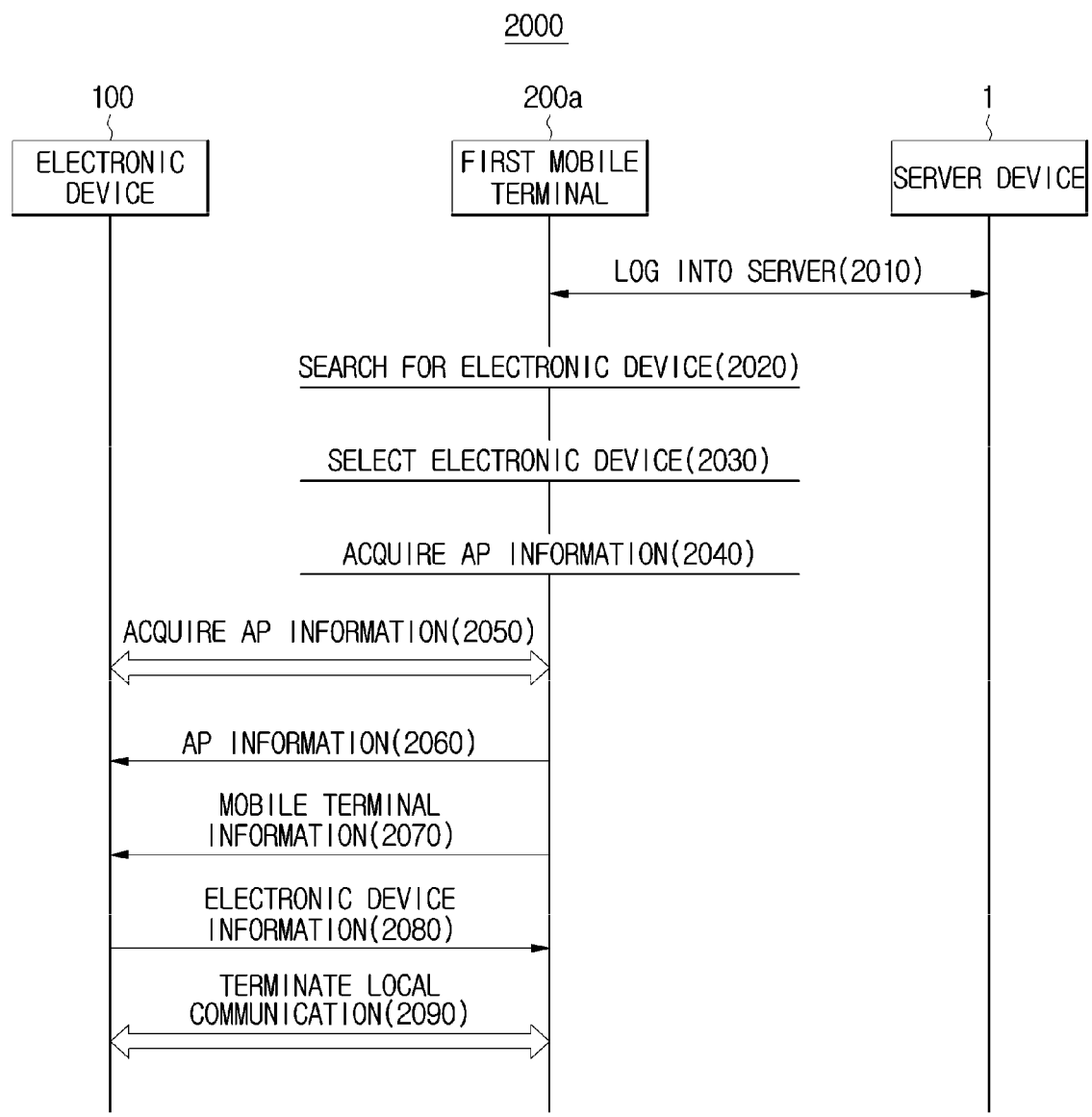

[Fig. 14]
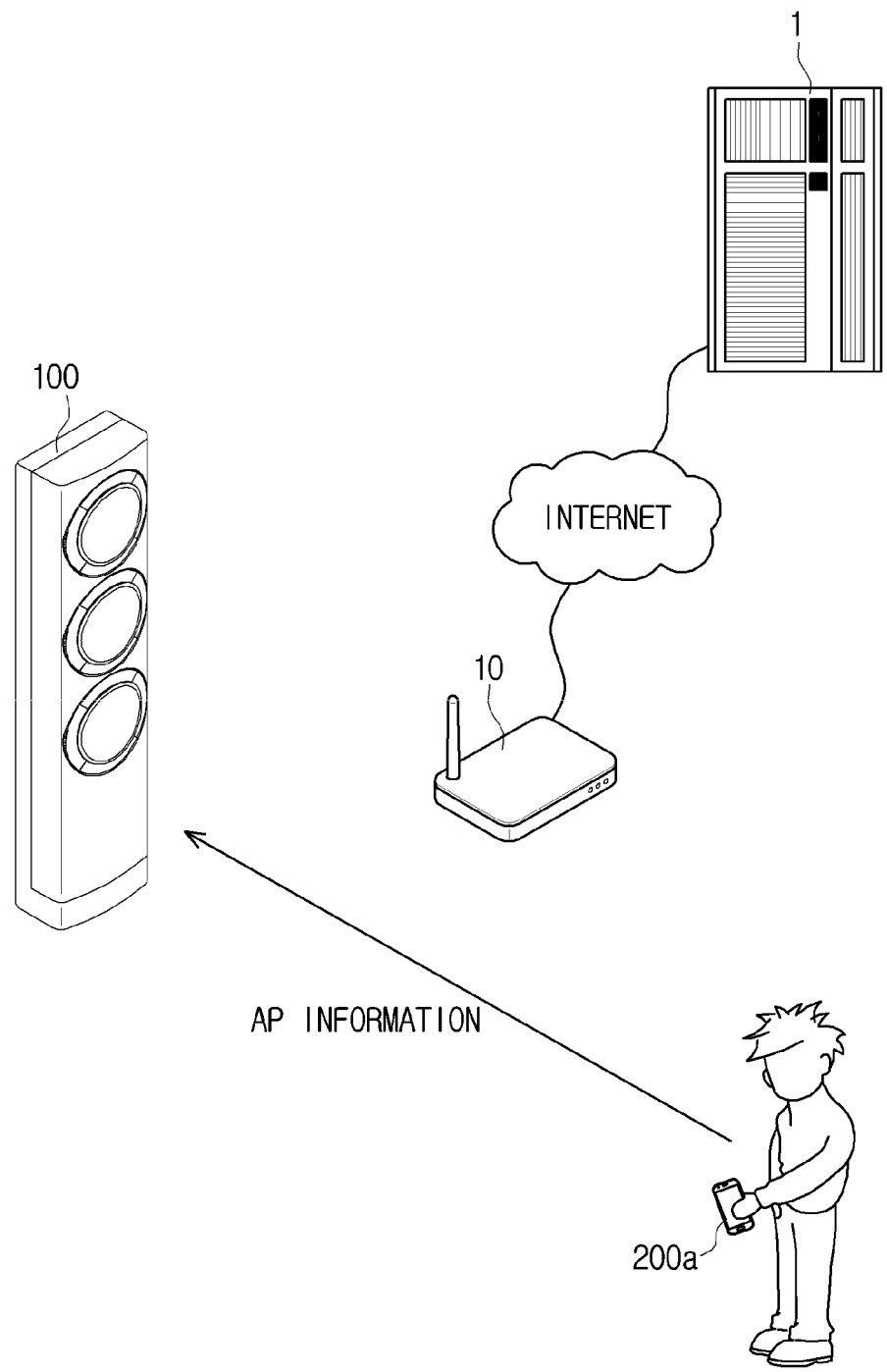

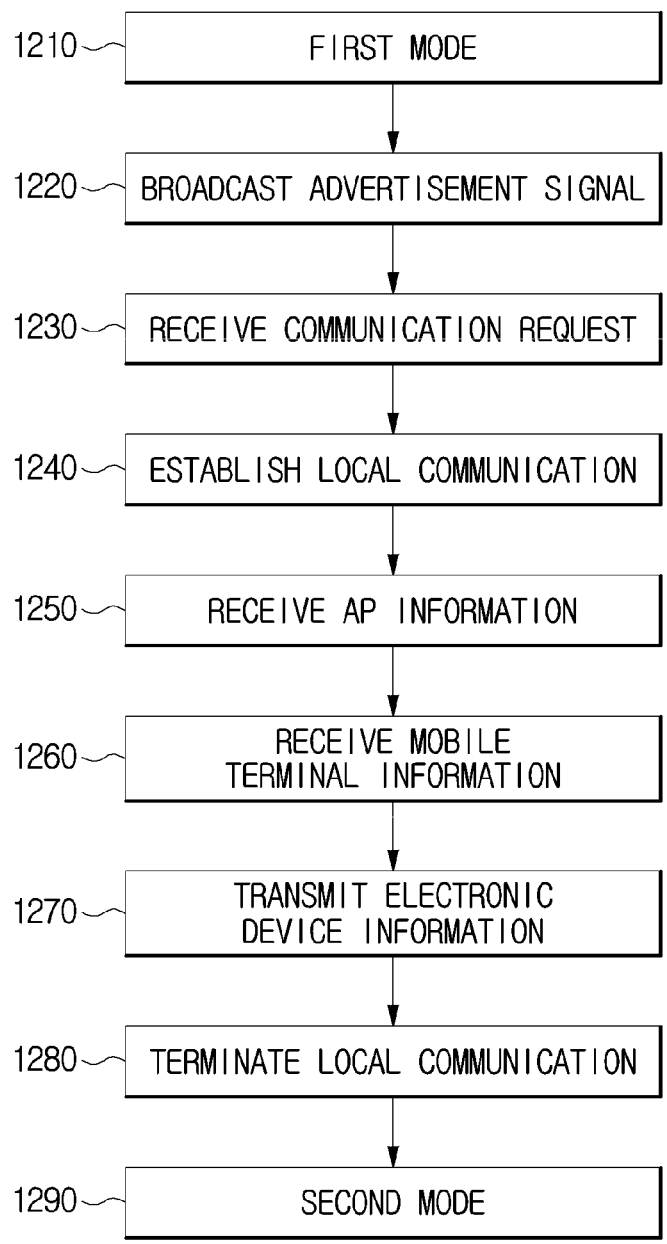
[Fig. 15]

[Fig. 16]
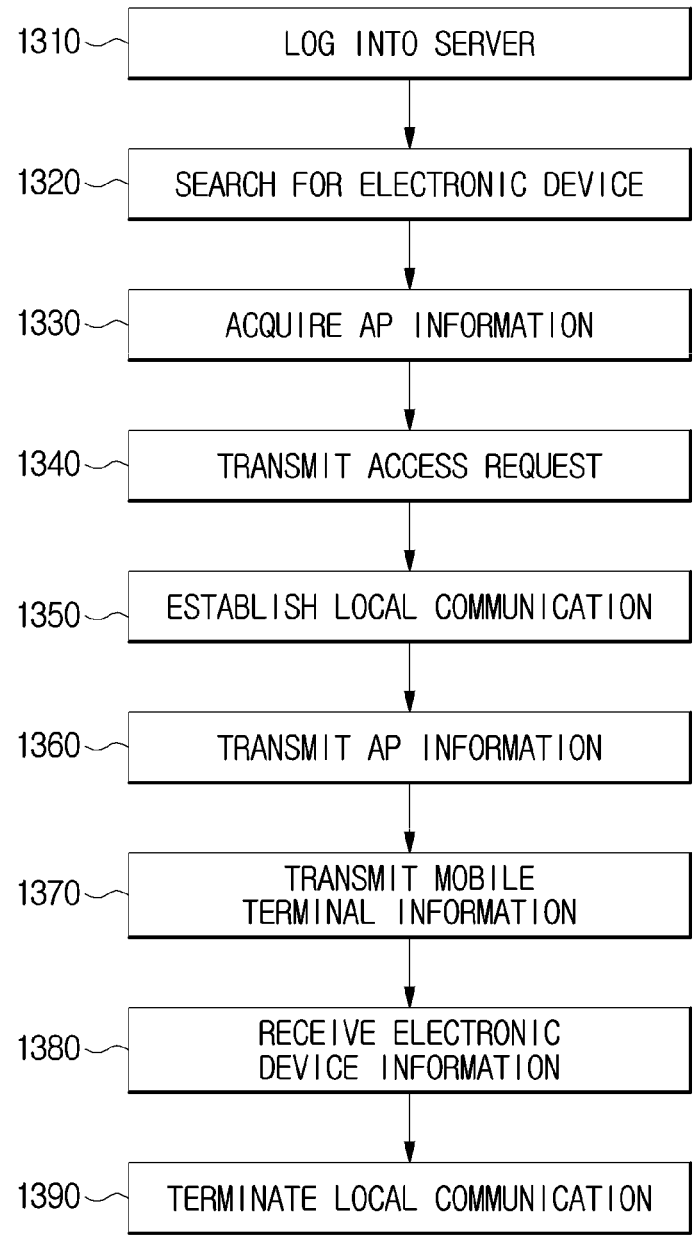

[Fig. 17]
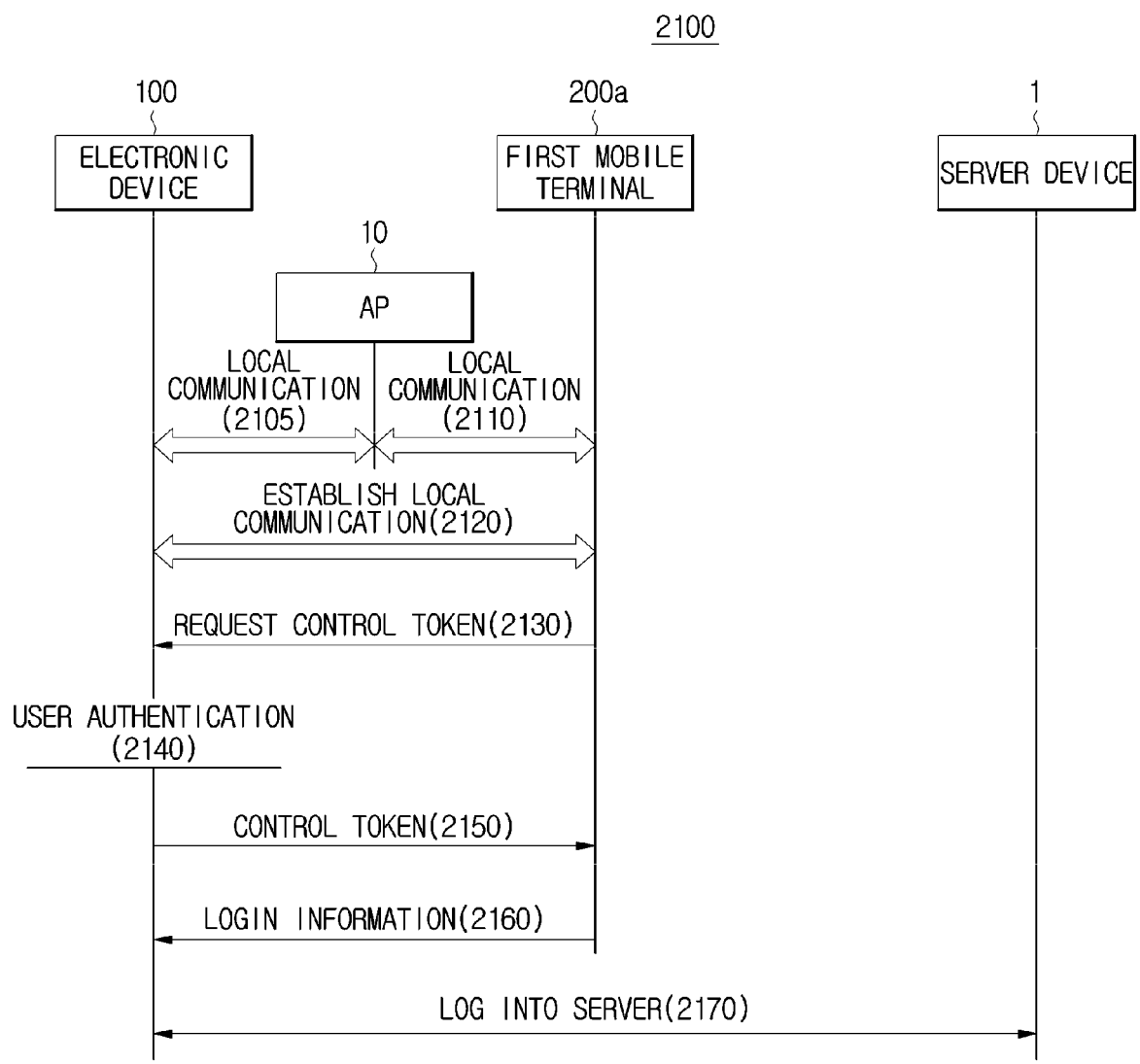

[Fig. 18]
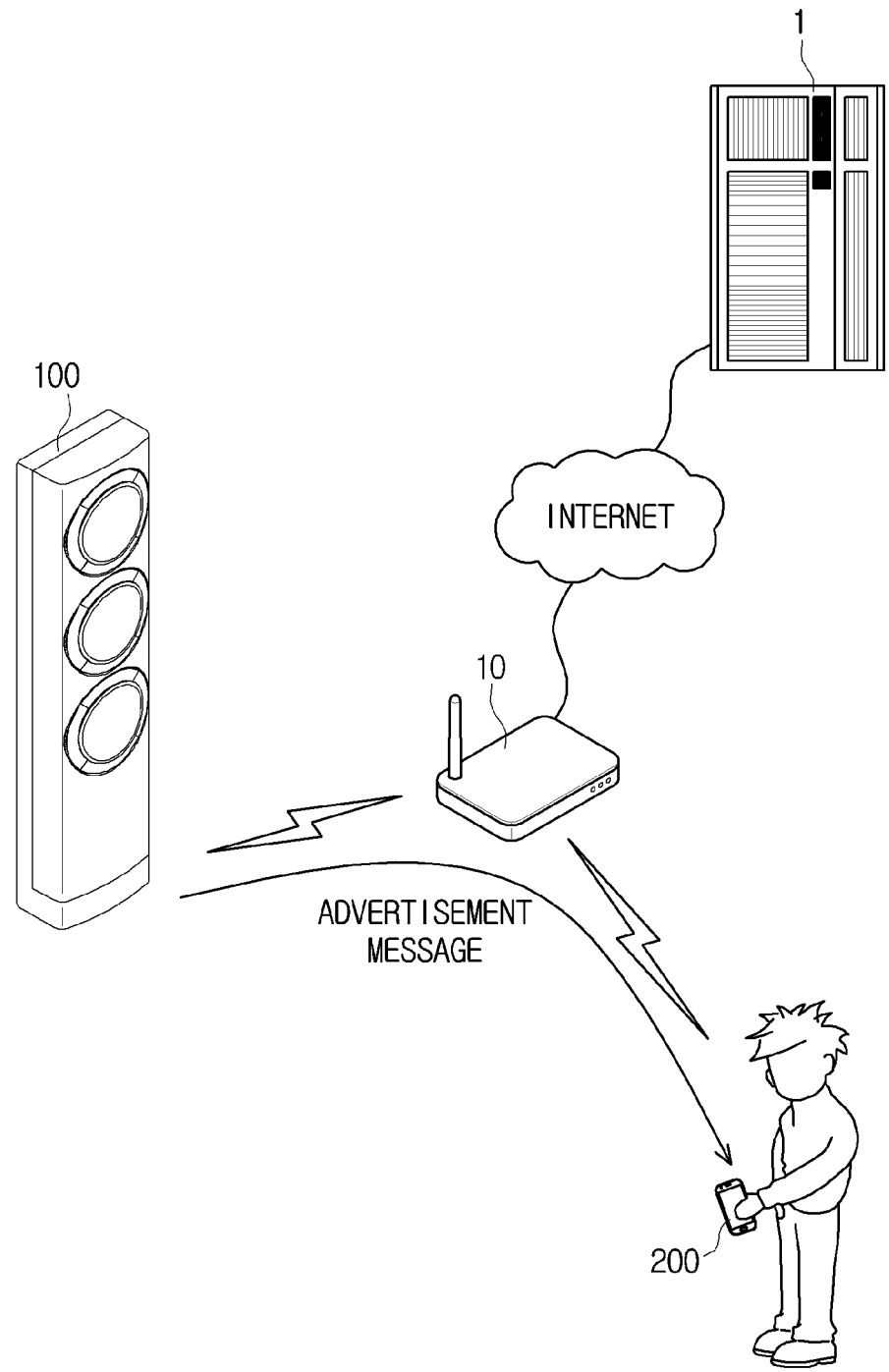

[Fig. 19]
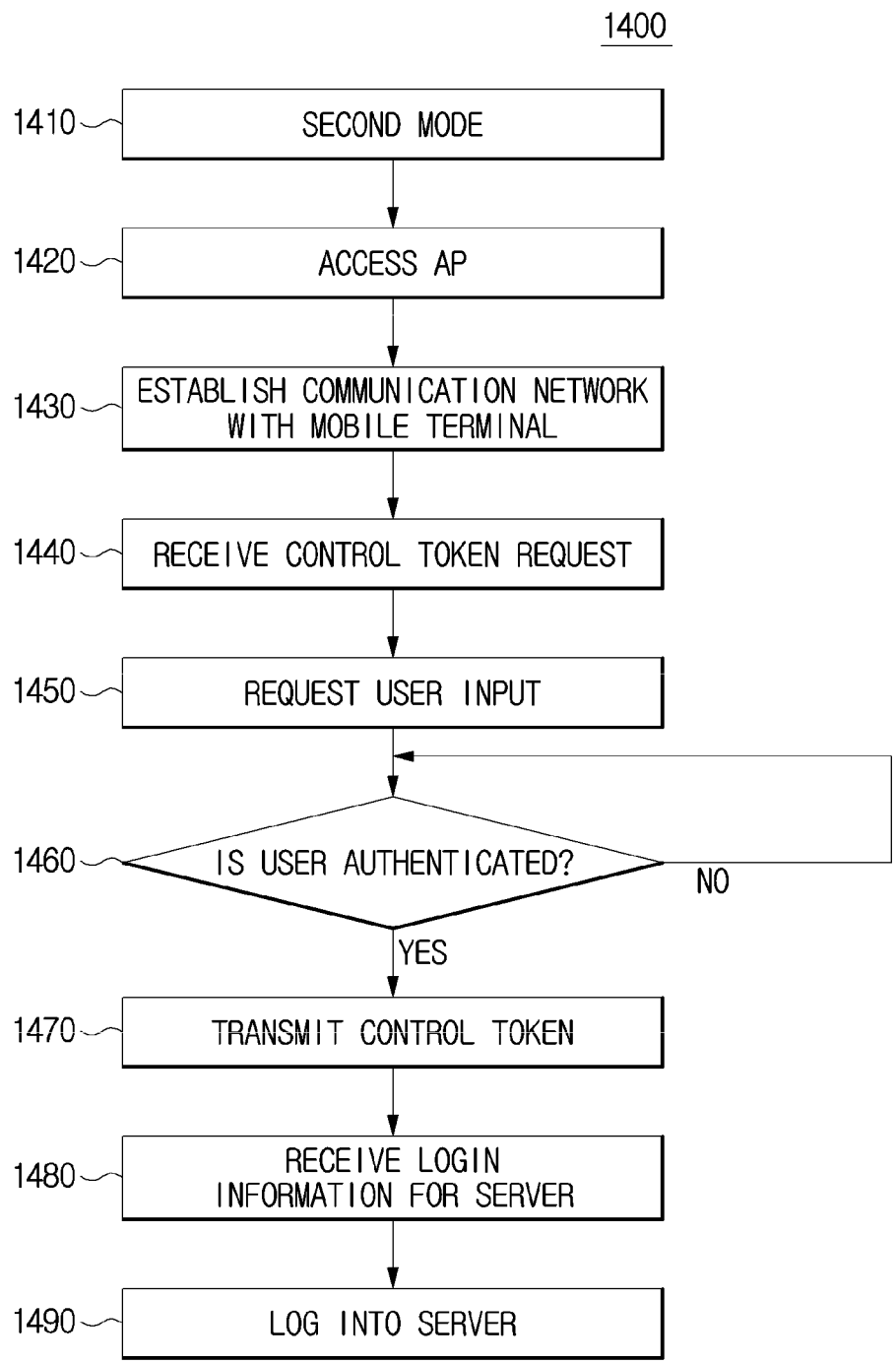

[Fig. 20]
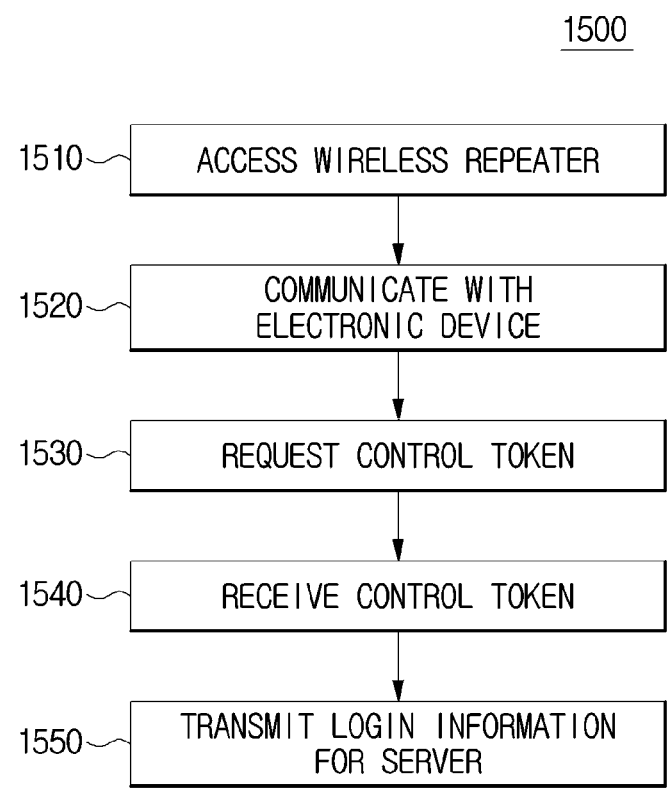

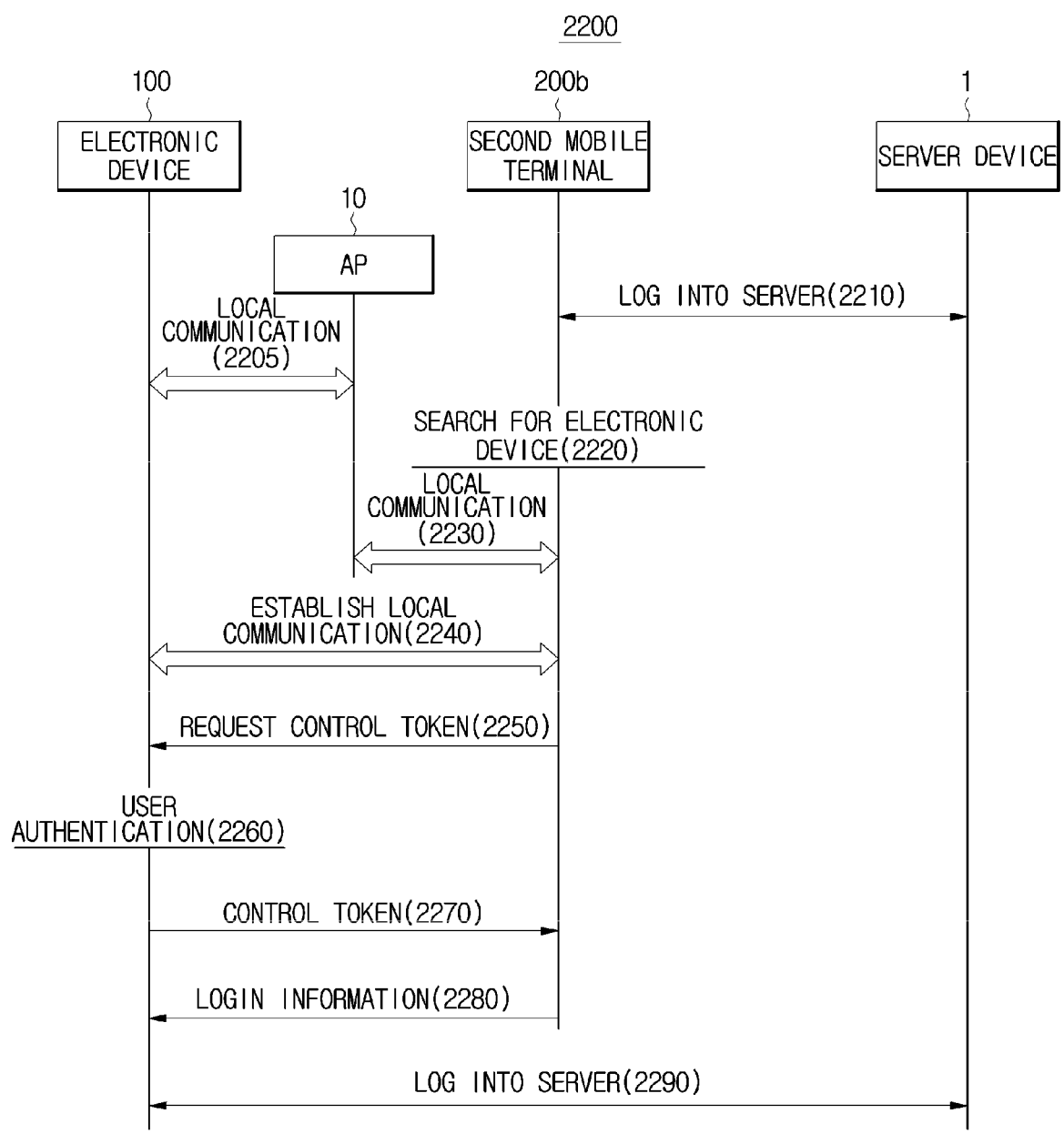
[Fig. 21]

[Fig. 22]
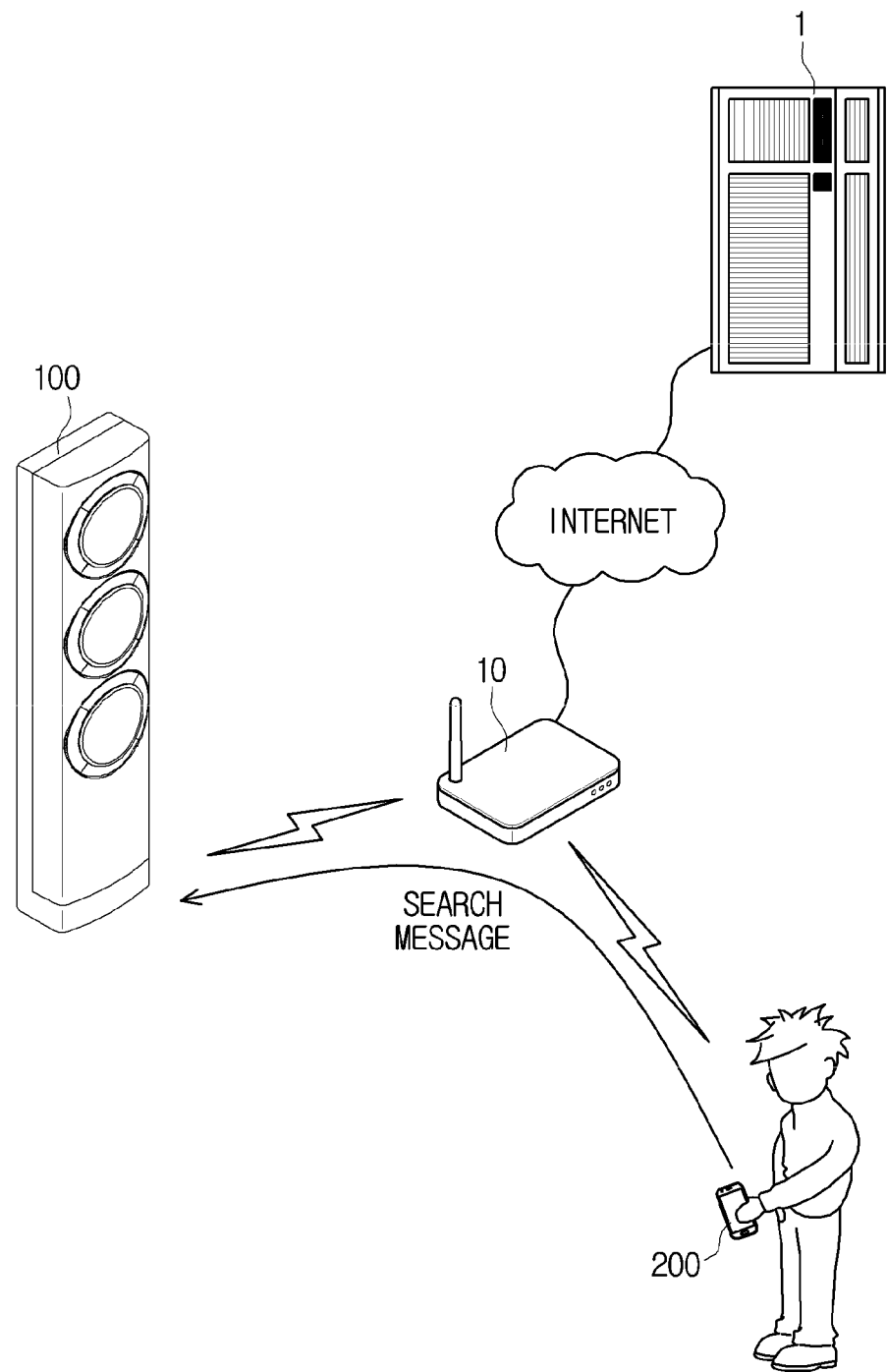

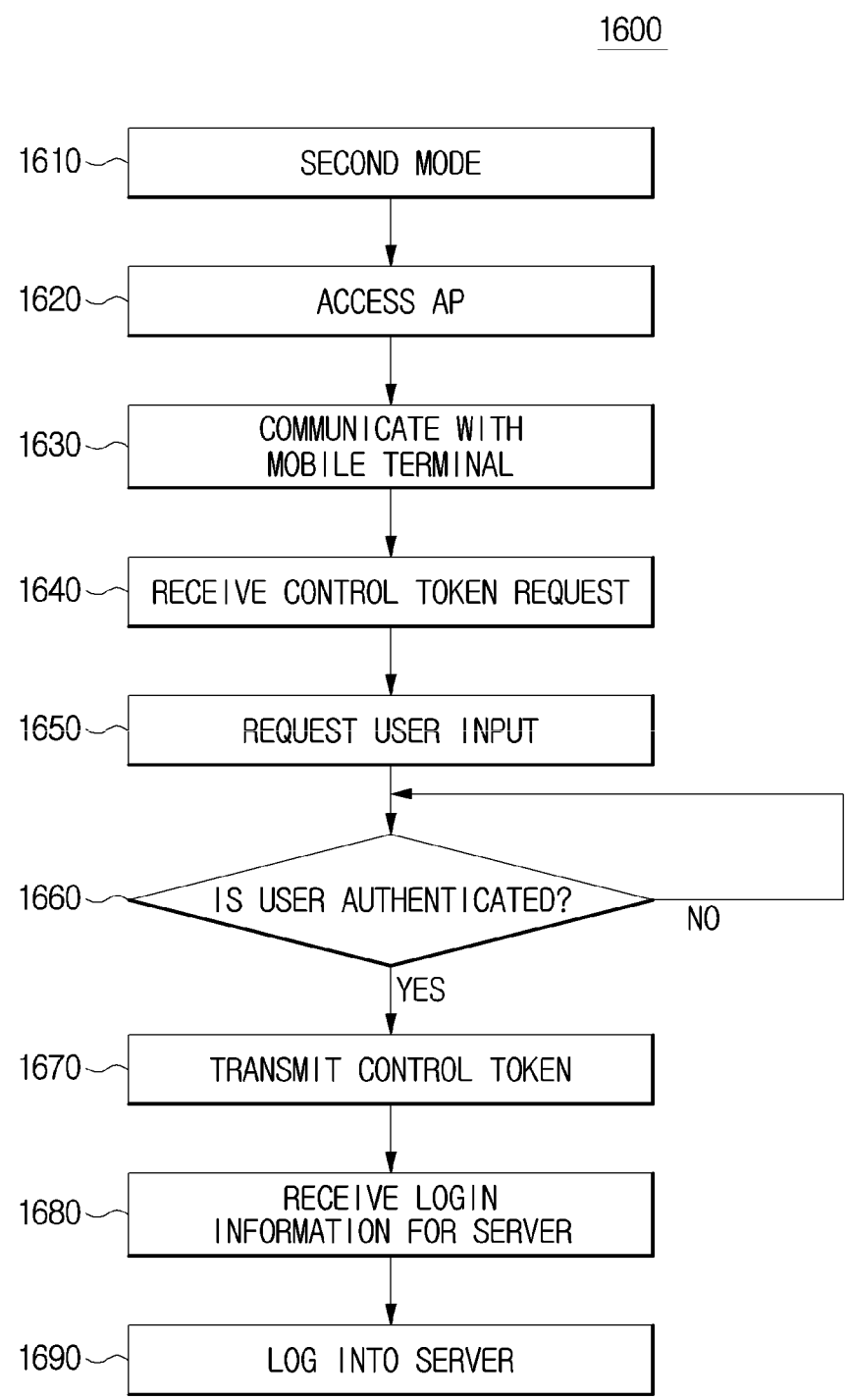
[Fig. 23]

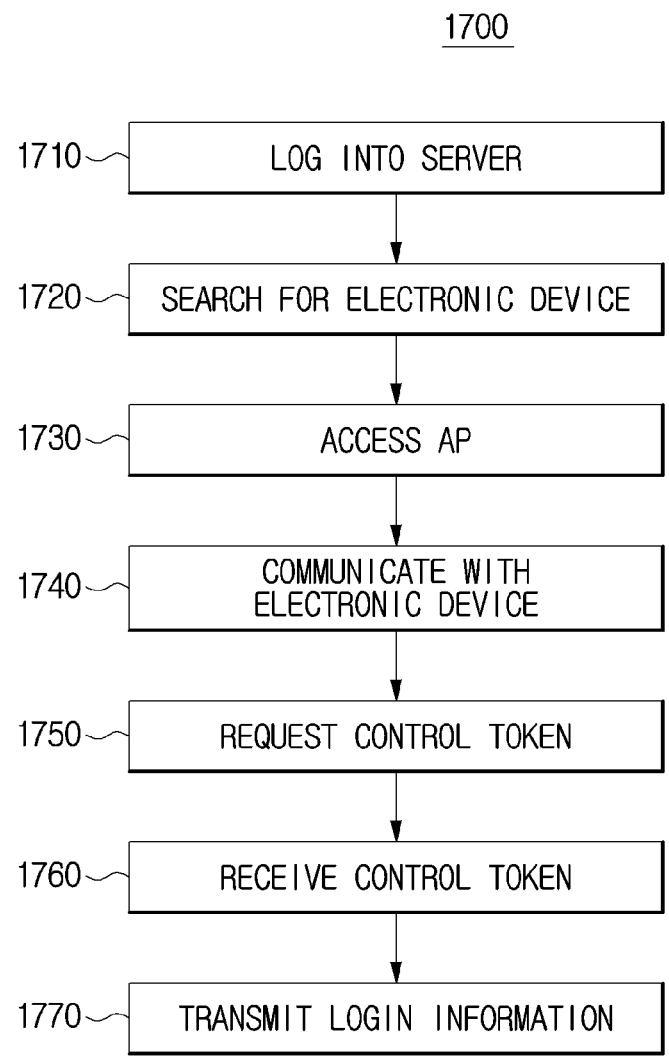
[Fig. 24]

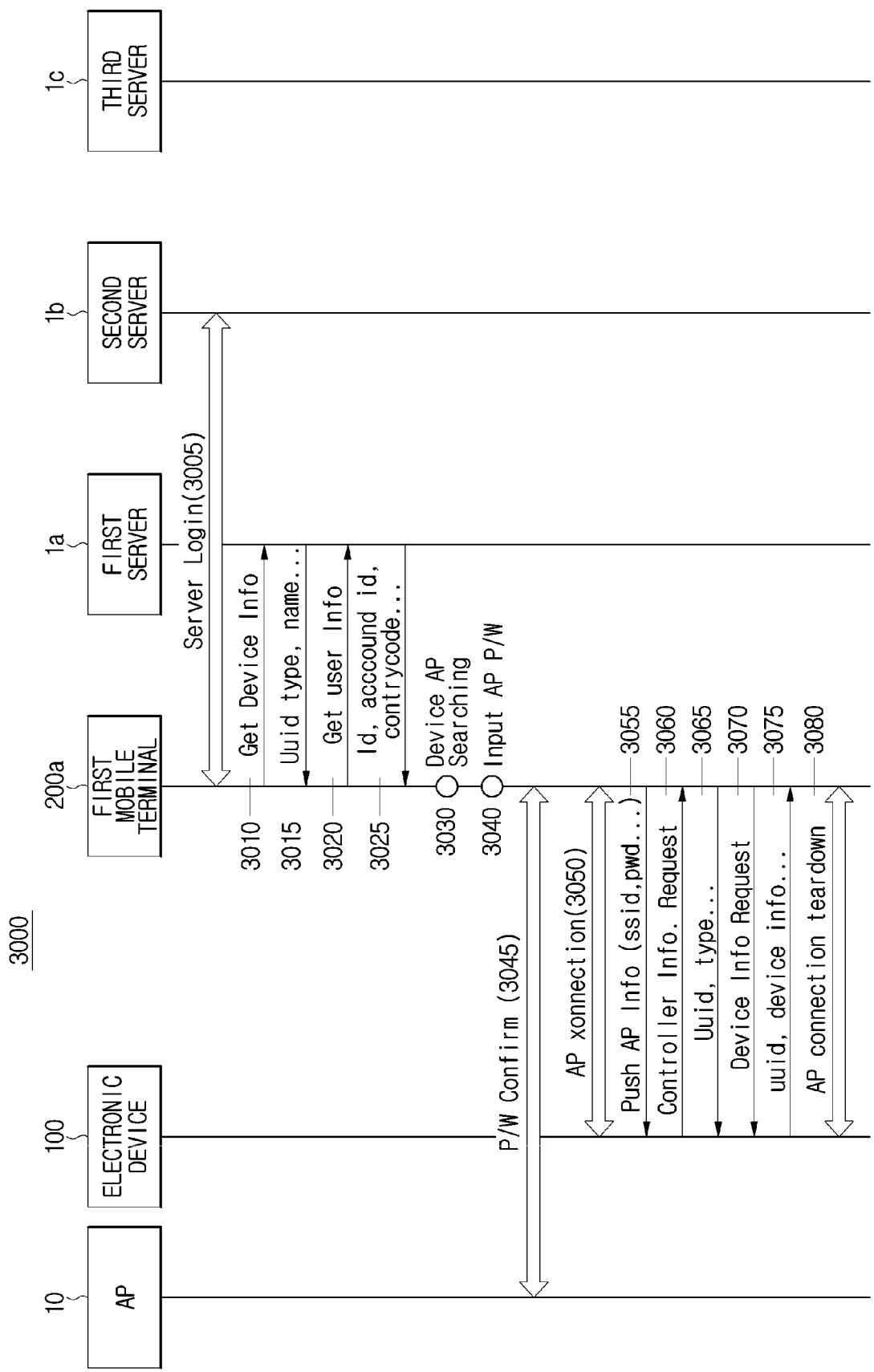
[Fig. 25]

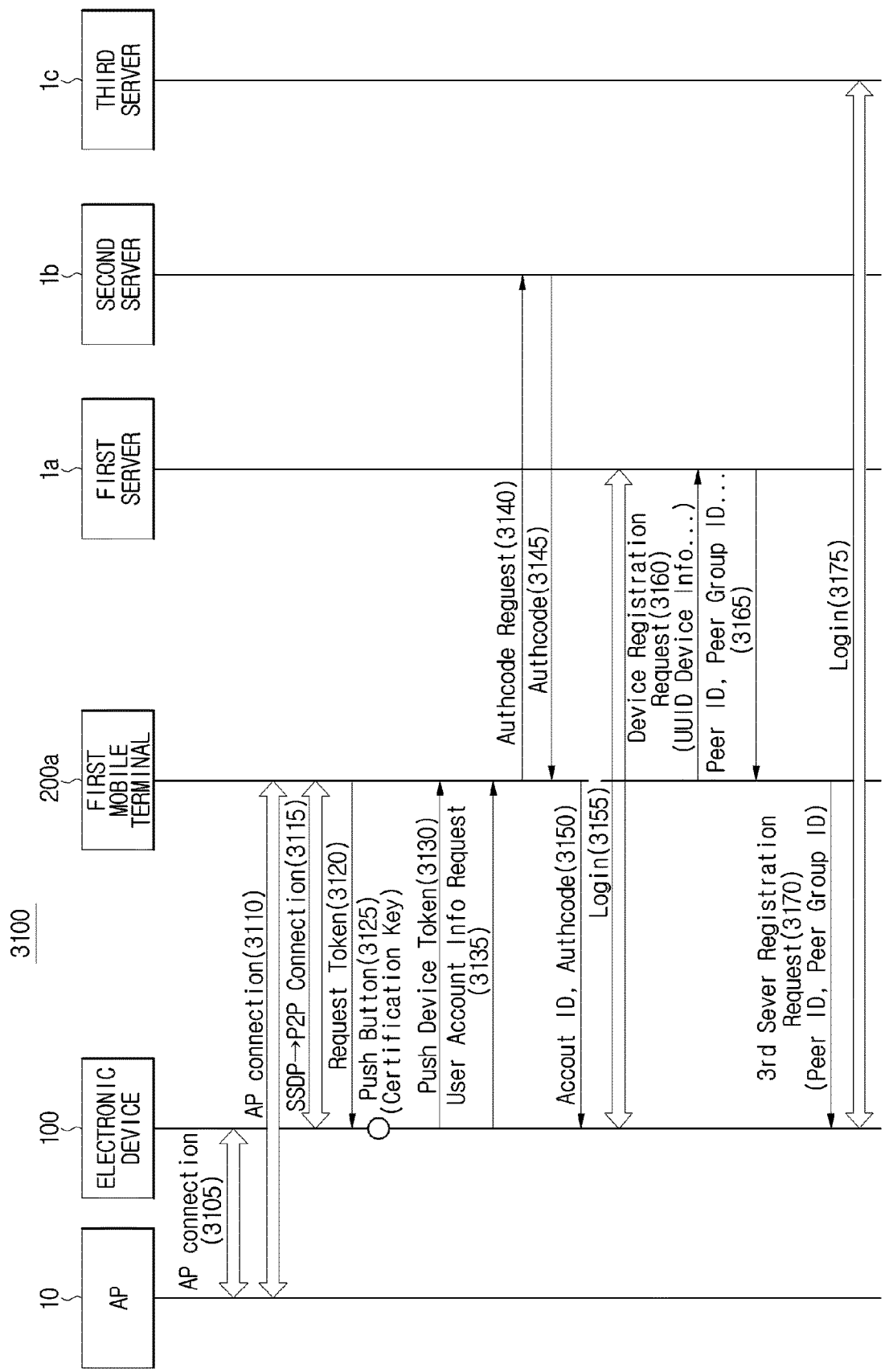
[Fig. 26]

[Fig. 27]
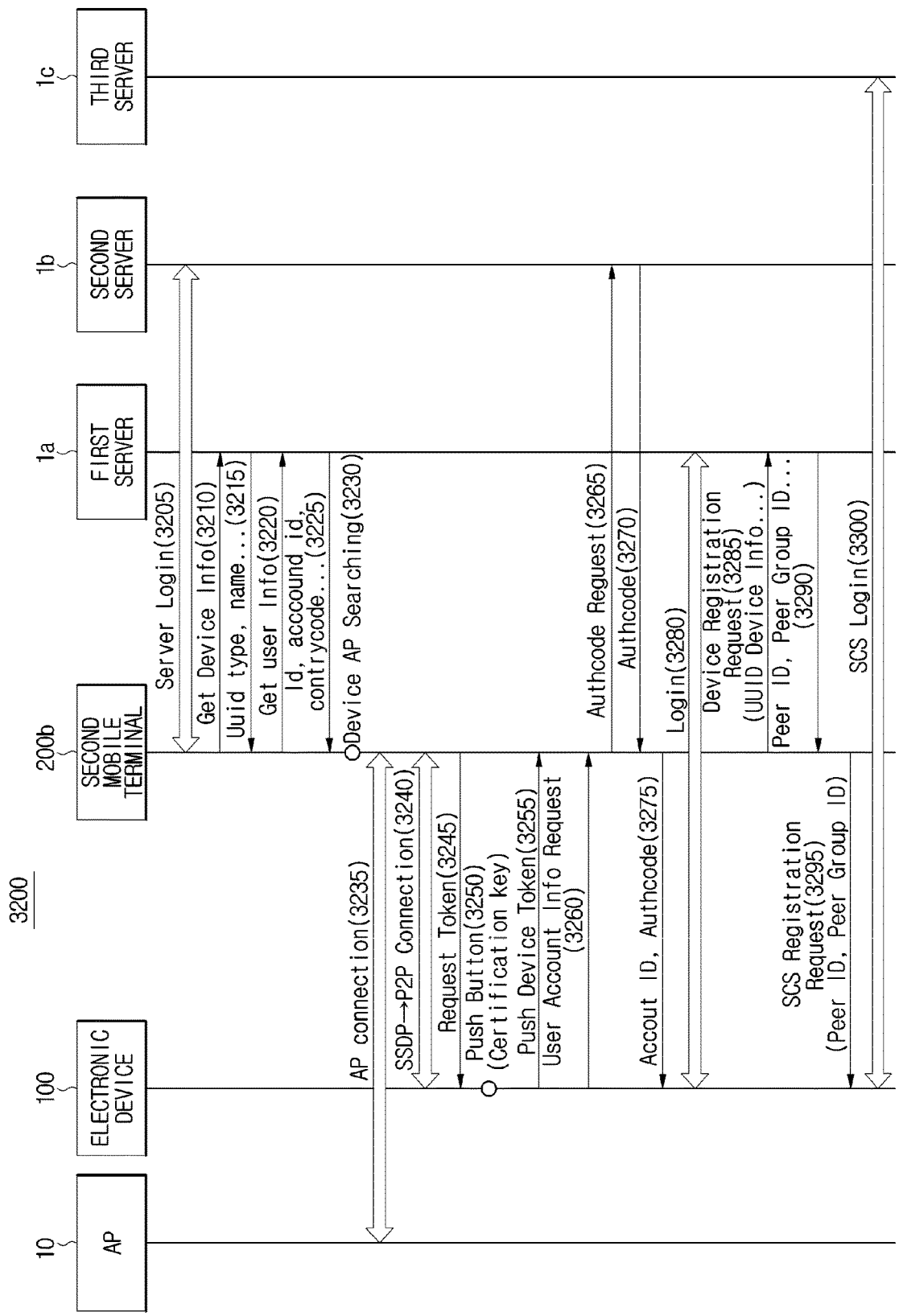

ELECTRONIC DEVICE, COMMUNICATION METHOD OF ELECTRONIC DEVICE, AND COMMUNICATION METHOD OF MOBILE TERMINAL

TECHNICAL FIELD

The present invention relates to an electronic device and a communication method of the same, and more particularly, to an electronic device which may access a wide area network (WAN), a communication method of an electronic device, and a communication method of a mobile terminal.

BACKGROUND ART

Most of recent electronic devices access a wide area network (WAN), such as the Internet, acquire information via the network, and provide additional services on the basis of the acquired information.

For example, a refrigerator which is a home appliance may acquire food information by accessing the Internet and provide a user with information for managing stored food. Also, an air conditioner may acquire information for air conditioning by accessing the Internet and provide a pleasant air conditioning service to a user on the basis of the acquired information.

An access point (AP) which is connected to a WAN, such as the Internet, is provided to make such an electronic device access the WAN, and the electronic device may access the WAN via the AP.

To access the AP, the electronic device should identify the AP through a service set identifier (SSID) of the AP and perform authentication by inputting an authentication code.

However, since most electronic devices include optimized buttons to receive control commands from users, there is inconvenience in inputting SSIDs and authentication codes of APs to electronic devices.

DISCLOSURE

Technical Problem

The present invention is directed to providing an electronic device to which a service set identifier (SSID) and an authentication code of an access point (AP) may be input by using a mobile terminal of a user, a communication method of an electronic device, and a communication method of a mobile terminal.

The present invention is also directed to providing an electronic device operating in a mode in which it is possible to receive an SSID and an authentication code of an AP from a mobile terminal, and a communication method of the electronic device.

The present invention is also directed to providing an electronic device which does not additionally acquire an SSID and an authentication code of an AP after acquiring the SSID and the authentication code of the AP, and a communication method of the electronic device.

Technical Solution

One aspect of the present invention provides a communication method of an electronic device, the communication method including: when power is supplied, wirelessly outputting an advertisement signal at predetermined time intervals; acquiring access information of an access point (AP) from an external device while outputting the advertisement signal; when the access information of the AP is acquired, stopping outputting the advertisement signal and accessing the AP on the basis of the access information of the AP; and when a time elapsed after the power is supplied without acquiring the access information of the AP is greater than a predetermined reference time, stopping outputting the advertisement signal.

The communication method may further include: when the power is supplied, ascertaining whether presence of previously stored access information; when there is no previously stored access information, outputting the advertisement signal at the predetermined time intervals; and when there is previously stored access information, accessing the AP by using the access information.

The acquiring of the access information of the AP from the external device may include: while outputting the advertisement signal, receiving a communication request of the external device; establishing communication with the external device in response to the communication request of the external device; and receiving the access information of the AP from the external device.

The acquiring of the access information of the AP from the external device may further include: receiving identification information of the external device from the external device; and transmitting identification information of the electronic device to the external device.

The access information of the AP may include identification information of the AP and authentication information of the AP, and the accessing to the AP on the basis of the access information of the AP may include: searching for an advertisement signal of the AP by using the identification information of the AP; and when an advertisement signal of the AP is found, accessing the AP by using the authentication information of the AP.

The communication method may further include: when connected to the AP, transmitting a control token of the electronic device to the external device via the AP; receiving account information for a server from the external device via the AP; and accessing the server via the AP and registering information of the electronic device in an account of the external device.

The transmitting of the control token to the external device may include: when a control token request is received from the external device, requesting a user input for user authentication; and when a user input made by a user coincides with a predetermined user input, transmitting the control token to the external device.

The communication method may further include: when connected to the AP, transmitting an advertisement message to the external device via the AP; and establishing communication with the external device via the AP in response to a response of the external device.

The advertisement signal may include a service set identifier (SSID) of the electronic device.

Another aspect of the present invention provides an electronic device including: a wireless communication unit; and a control unit configured to operate in a first mode when power is supplied, and to switch to a second mode when an elapsed time after the power supply is greater than a predetermined reference time. The control unit outputs an advertisement signal at predetermined time intervals through the wireless communication unit in the first mode, and receives an advertisement signal of an external device through the wireless communication unit in the second mode.

When access information of an AP is acquired in the first mode, the control unit may switch to the second mode.

The control unit may access the AP on the basis of the access information of the AP in the second mode.

When connected to the AP, the control unit may transmit a control token to a mobile terminal via the AP.

When a transmission request for the control token is received from the mobile terminal, the control unit may request a user input for user authentication, and transmit the control token to the mobile terminal when a user input made by a user coincides with a predetermined user input.

The advertisement signal may include an SSID of the electronic device.

Another aspect of the present invention provides a communication method of a mobile terminal, the communication method including: searching for an advertisement signal of a predetermined electronic device; when any advertisement signal of the electronic device is not received, searching for an advertisement signal of an AP; when an advertisement signal of the AP is received, accessing the AP; and when connected to the AP, receiving a control token of the electronic device from the electronic device via the AP.

The communication method may further include: when an advertisement signal of the electronic device is received, receiving access information of the AP from a user; and transmitting the access information input by the user to the electronic device.

The transmitting of the access information input by the user to the electronic device may include, when a plurality of advertisement signals are received, transmitting the access information to an electronic device which outputs an advertisement signal with a highest signal intensity.

The transmitting of the access information input by the user to the electronic device may include, when a plurality of advertisement signals are received, transmitting the access information to an electronic device selected by the user.

The communication method may further include: when connected to the AP, transmitting a search message to the electronic device via the AP; and establishing communication with the electronic device via the AP in response to a response of the electronic device.

The communication method may further include: transmitting login information for a server to the electronic device via the AP; and receiving server registration information of the electronic device when the electronic device logs into the server.

Another aspect of the present invention provides a communication method of an electronic device, the communication method including: communicating with a server device via an AP; when a search message is received from an external device via the AP, establishing communication with the external device; requesting a user input for user authentication in response to a control token request of the external device; and transmitting a control token to the external device when a user input made by a user is identical to a predetermined user input.

The communication method may further include: receiving account information for a server from the external device via the AP; and accessing the server via the AP and registering information of the electronic device in an account of the external device.

Advantageous Effects

According to one aspect of the present invention, it is possible to provide an electronic device to which a service set identifier (SSID) and an authentication code of an access point (AP) may be input by using a mobile terminal of a user, a communication method of an electronic device, and a communication method of a mobile terminal.

According to another aspect of the present invention, it is possible to provide an electronic device operating in a mode in which an SSID and an authentication code of an AP can be received from a mobile terminal, and a communication method of the electronic device.

According to another aspect of the present invention, it is possible to provide an electronic device which does not additionally acquire an SSID and an authentication code of an AP after acquiring the SSID and the authentication code of the AP, and a communication method of the electronic device.

DESCRIPTION OF DRAWINGS

FIG. 1 shows a configuration of a home network system according to an embodiment.

FIG. 2 shows a configuration of an electronic device according to an embodiment.

FIGS. 3 and 4 show operating modes of a communication part included in an electronic device according to an embodiment.

FIGS. 5A and 5B show operation of an electronic device according to an embodiment.

FIG. 6 shows a configuration of a mobile terminal according to an embodiment.

FIG. 7 shows operation of a mobile terminal according to an embodiment.

FIGS. 8 to 11 show an example in which a mobile terminal selects at least one of a plurality of electronic devices according to an embodiment.

FIG. 12 shows an example in which a mobile terminal broadcasts information of an access point (AP) to a plurality of electronic devices according to an embodiment.

FIG. 13 shows an example of a communication method of a home network system according to an embodiment.

FIG. 14 shows an electronic device acquiring information of an AP according to the communication method shown in FIG. 13.

FIG. 15 shows an example of a communication method of an electronic device according to an embodiment.

FIG. 16 shows an example of a communication method of a mobile terminal according to an embodiment.

FIG. 17 shows an example of a communication method of a home network system according to an embodiment.

FIG. 18 shows an electronic device and a mobile terminal which communicate together according to the communication method shown in FIG. 17.

FIG. 19 shows an example of a communication method of an electronic device according to an embodiment.

FIG. 20 shows an example of a communication method of a mobile terminal according to an embodiment.

FIG. 21 shows an example of a communication method of a home network system according to an embodiment.

FIG. 22 shows an electronic device and a mobile terminal which communicate together according to the communication method shown in FIG. 21.

FIG. 23 shows an example of a communication method of an electronic device according to an embodiment.

FIG. 24 shows an example of a communication method of a mobile terminal according to an embodiment.

FIG. 25 shows an example of a communication method of a home network system according to an embodiment.

FIG. 26 shows an example of a communication method of a home network system according to an embodiment.

FIG. 27 shows an example of a communication method of a home network system according to an embodiment.

MODES OF THE INVENTION

Like reference numerals refer to like components throughout. The present specification does not describe all elements of embodiments, and common knowledge in the technical field to which the present invention pertains or the same descriptions of the embodiments will be omitted. The term "unit," "module," "member," or "block" may be implemented by using hardware or software. According to embodiments, one component may be implemented by a plurality of "units," "modules," "members," or "blocks," or one "unit," "module," "member," or "block" may include a plurality of components.

Throughout this specification, when a part is referred to as being "connected" to another part, the two parts may not only be directly connected but may also be indirectly connected, and an indirect connection includes a connection via a wireless communication network.

When a part is referred to as "including" a component, other components are not excluded therefrom and may be further included unless specified otherwise.

Throughout this specification, when a member is referred to as being positioned "on" another member, the member may be in contact with the other member or another member may be interposed between the two members.

The terms "first," "second," etc. are used to distinguish one component from other components, and components are not limited by the terms.

An expression in the singular form includes the plural form unless explicitly stated otherwise.

Identification numbers of respective steps are used for convenience of description, and do not describe a sequence of the respective steps. The steps may be carried out in a sequence different from that described unless a particular sequence is specified.

Hereinafter, operating principles and embodiments of the present invention will be described with reference to the accompanying drawings.

FIG. 1 shows a configuration of a home network system according to an embodiment.

As shown in FIG. 1, a home network system may include an electronic device 100, a mobile terminal 200, an access point (AP) 10, and a server device 1.

The electronic device 100 is a device that provides a service to a user at home, and may include a washing machine 100-1 providing a laundry service for laundry, a refrigerator 100-2 providing a preservation service for food, an air conditioner 100-3 providing an air conditioning service, and the like. In the drawing, the washing machine 100-1, the refrigerator 100-2, and the air conditioner 100-3 are shown as the electronic device 100, but they are only examples of the electronic device 100. The electronic device 100 may include any electronic device capable of communicating with the AP 10.

The electronic device 100 may not only provide a unique service to a user but may also provide an additional service related to the unique service through communication with an external device.

For example, the electronic device 100 may acquire information, such as weather, news, recipes, washing methods, etc., from an external device via a wide area network (WAN), such as the Internet, and may directly display the acquired information to a user or provide an additional service to a user on the basis of the acquired information.

Also, the electronic device 100 may receive a control command of a user through communication and operate according to the received control command. For example, a user may input a control command to the electronic device 100 not only through a button provided in the electronic device 100 but also through the mobile terminal 200.

The electronic device 100 may acquire a control command input through the mobile terminal 200 through communication, and provide a service to a user according to the acquired control command.

In this way, the electronic device 100 may provide various services to a user through data communication with an external device such as the server device 1 or the mobile terminal 200.

For example, the electronic device 100 may directly communicate with the mobile terminal 200 or directly access a WAN to which the server device 1 is connected. In this case, the electronic device 100 is required to separately have a communication module for communicating with the mobile terminal 200 and a communication module for accessing the WAN.

In another example, the electronic device 100 may communicate with the mobile terminal 200 via the AP 10 or access the WAN via the AP 10. In this case, as long as the electronic device 100 has a standardized communication module for communicating with the AP 10, the electronic device 100 may communicate with the mobile terminal 200 and access the WAN via the AP 10.

To help understanding, it is assumed below that the electronic device 100 communicates with the mobile terminal 200 and accesses the WAN via the AP 10.

The AP 10 may be variously referred to as "hub," "router," "switch," "gateway," etc., and may relay communication between the electronic device 100 and the mobile terminal 200. Also, the AP 10 may connect a local area network (LAN) composed of the electronic device 100 and the mobile terminal 200 to the WAN.

For example, the AP 10 may communicate with the electronic device 100 or the mobile terminal 200 by using a wireless communication standard, such as Wireless Fidelity (Wi-Fi™; Institute of Electrical and Electronics Engineers (IEEE) 802.11), Bluetooth™ (IEEE 802.15.1), Zigbee (IEEE 802.15.4), or the like, and may access the WAN by using a wired communication standard, such as Ethernet™ (IEEE 802.3) or the like.

The LAN may be formed between the electronic device 100 and the mobile terminal 200 centering around the AP 10. In other words, the electronic device 100 and the mobile terminal 200 may exchange data via the AP 10.

Also, the AP 10 may relay between the WAN and the LAN composed of the electronic device 100 and the mobile terminal 200. In other words, the electronic device 100 and the mobile terminal 200 may access the WAN, such as the Internet, via the AP 10.

In particular, the AP 10 may broadcast an advertisement signal to notify an external device of its presence. The electronic device 100 and/or the mobile terminal 200 receiving the advertisement signal of the AP 10 may transmit a communication request to the AP 10.

The mobile terminal 200 may provide various communication services, such as a voice communication service, a data communication service, etc., to a user.

In particular, the mobile terminal 200 is capable of local communication and mobile communication. Here, local communication denotes communication allowed in a specific area, and mobile communication denotes communication which is allowed anywhere without spatial limitations.

For example, when the mobile terminal 200 is positioned close to the AP 10, the mobile terminal 200 may access the AP 10 according to a selection of a user. At this time, the mobile terminal 200 may communicate with the AP 10 through local communication. Further, the mobile terminal 200 may communicate with the electronic device 100 or access the WAN via the AP 10. In other words, the mobile terminal 200 may exchange data with the electronic device 100 and exchange data with the server device 1 connected to the WAN through local communication.

In another example, when the mobile terminal 200 is far away from the AP 10, the mobile terminal 200 may access a base station ST according to a selection of a user. At this time, the mobile terminal 200 may communicate with the base station ST through mobile communication, and may access the WAN via the base station ST. Further, the mobile terminal 200 may communicate with the electronic device 100 via the server device 1 and the AP 10 connected to the WAN. In other words, the mobile terminal 200 may exchange data with the electronic device 100 and exchange data with the server device 1 through mobile communication.

The server device 1 is connected to the WAN, and may provide various services to the electronic device 100 and the mobile terminal 200. For example, the server device 1 may relay communication between the electronic device 100 and the mobile terminal 200 connected to the WAN.

As described above, when the mobile terminal 200 is positioned close to the AP 10, the mobile terminal 200 may communicate with the electronic device 100 via the AP 10.

However, when the mobile terminal 200 is positioned far away from the AP 10, the mobile terminal 200 may access the WAN via the base station ST and communicate with the electronic device 100 via the WAN.

When the mobile terminal 200 accesses the LAN, the AP 10 may relay communication between the mobile terminal 200 and the electronic device 100. On the other hand, when the mobile terminal 200 directly accesses the WAN, the server device 1 may relay communication between the mobile terminal 200 and the electronic device 100.

For example, when a user inputs a control command through the mobile terminal 200, the input control command is transmitted to the server device 1 via the WAN, processed by the server device 1, and transmitted from the server device 1 to the electronic device 100 via the WAN.

To relay communication between the mobile terminal 200 and the electronic device 100 in this way, the server device 1 may store an address (e.g., an Internet protocol (IP) address) of the mobile terminal 200 and an address (e.g., an IP address) of the electronic device 100 in the WAN.

Besides, even when the mobile terminal 200 and the electronic device 100 are connected to the AP 10, the server device 1 may relay communication between the mobile terminal 200 and the electronic device 100 in the WAN. In other words, when the mobile terminal 200 and the electronic device 100 are connected to the AP 10, the mobile terminal 200 and the electronic device 100 may communicate with each other via the server device 1. This is because the server device 1 manages both the address (e.g., the IP address) of the mobile terminal 200 and the address (e.g., the IP address) of the electronic device 100.

A configuration of a home network has been described above.

Configurations and operation of the electronic device 100 and the mobile terminal 200 constituting the home network will be described below.

FIG. 2 shows a configuration of an electronic device according to an embodiment.

As shown in FIG. 2, the electronic device 100 may include an input unit 120, a display unit 130, a sensing unit 140, an operating unit 150, a storage unit 160, a communication unit 170, and a control unit 110.

The input unit 120 may include a button module 121 for receiving a user input from a user.

The button module 121 may include a plurality of buttons for receiving predetermined user inputs.

Also, the button module 121 may include buttons of various forms, such as a push button, a dial, a touch sensor, and the like.

The display unit 131 may include a display panel 131 and an indicator 132 which display a value set by a user input or display an operation of the electronic device 100.

The display panel 131 may include a liquid crystal display (LCD) panel, a light-emitting diode (LED) panel, etc. which converts an electrical signal into an optical signal.

The indicator 132 may include an LED which converts an electrical signal into an optical signal.

The sensing unit 140 may sense an external environment or an internal state of the electronic device 100, and the operating unit 150 may provide a unique service of the electronic device 100.

The storage unit 160 may store a control program and control data for controlling operation of the electronic device 100. In particular, when identification information (e.g., a service set identifier (SSID)) and authentication information (e.g., a password) of the AP 10 are acquired, the storage unit 160 may store the identification information and the authentication information of the AP 10.

The storage unit 160 may include a non-volatile memory in which a program or data is not lost even when power is cut off. For example, the storage unit 160 may include a high-capacity flash memory, a solid state drive (SSD) 161, or the like.

The communication unit 170 may include a local area communication module 171 capable of exchanging wireless signals with an external device in an area close to the external device.

The local area communication module 171 may exchange data with the mobile terminal 200 and/or the AP 10 by using wireless signals. In other words, the local area communication module 171 may transmit a wireless signal including transmission data to the mobile terminal 200 and/or the AP 10 and receive a wireless signal including reception data from the mobile terminal 200 and/or the AP 10.

The local area communication module 171 which performs wireless communication as described above may include an antenna for transmitting a wireless signal to free space or receiving a wireless signal from free space, a modulator/demodulator for modulating data to be transmitted or demodulating the received wireless signal, an encoder/decoder for encoding the data to be transmitted or decoding received data, and the like.

A communication target of data and a communication target of a wireless signal may differ from each other. In other words, a target device to which a wireless signal is transmitted and a target device to which data is transmitted may differ from each other.

For example, the local area communication module 171 may wirelessly transmit a wireless signal to the AP 10. At this time, data included in the wireless signal may be transmitted to the server device 1 via the AP 10. Also, data transmitted from the server device 1 to the electronic device 100 may be modulated into a wireless signal by the AP 10, and the local area communication module 171 may receive the wireless signal including the data from the AP 10.

The local area communication module 171 may exchange wireless signals with the AP 10 by using a wireless communication standard, such as Wi-Fi™ (IEEE 802.11), Bluetooth™ (IEEE 802.15.1), Zigbee (IEEE 802.15.4), or the like.

Also, the local area communication module 171 may operate in two modes to access the AP 10. Specifically, the local area communication module 171 may operate in a first mode for acquiring information of the AP 10 from an external device (e.g., a mobile terminal) and a second mode for accessing the AP 10 on the basis of the information of the AP 10 acquired in the first mode.

Operation of the local area communication module 171 in the first mode and the second mode will be described in detail below.

Although not shown in the drawing, the communication unit 170 may include a wired communication module capable of transmitting and receiving data in a wired manner. The wired communication module may communicate with the mobile terminal 200 and/or the AP 10 by using a wired communication standard, such as Ethernet™ (IEEE 802.3), universal serial bus (USB), or the like.

The control unit 110 may control operation of the above-described input unit 120, display unit 130, sensing unit 140, operating unit 150, storage unit 160, and communication unit 170.

For example, to exchange data with the mobile terminal 200, the control unit 110 may control the communication unit 170 so that the communication unit 170 exchanges wireless signals with the AP 10.

Also, the control unit 110 may control the sensing unit 140 and the operating unit 150 according to a control command received through the communication unit 170 so that a service is provided to a user.

The control unit 110 may include a processor 111 which performs computation to control operation of the electronic device 100, and a memory 112 which stores a program and data related to a computing operation of the processor 111.

According to the program stored in the memory 112, the processor 111 may load the data stored in the memory 112 and perform an arithmetic operation or a logical operation on the loaded data. Also, the processor 111 may output a result of the arithmetic operation or the logical operation to the memory 112.

The memory 112 may include a volatile memory which loses stored data when power supply is cut off.

The volatile memory may load a program and data from the above-described storage unit 160 and temporarily store the loaded data. Also, the volatile memory may provide the stored program and data to the processor 111 and store data output from the processor 111.

The volatile memory may include a static random access memory (S-RAM), a dynamic random access memory (D-RAM), and the like.

Also, the memory 112 may include a non-volatile memory as necessary. The non-volatile memory may maintain stored data when power supply is cut off. The non-volatile memory included in the memory 112 may store firmware for managing and initializing various components included in the electronic device 100. The non-volatile memory may include a read only memory (ROM), an erasable programmable read only memory (EPROM), an electrically erasable programmable read only memory (EEPROM), a flash memory, and the like.

The processor 111 and the memory 112 have been described as being functionally distinguished, but the processor 111 and the memory 112 are not necessarily distinguished physically. For example, the processor 111 and the memory 112 may be implemented as one chip as well as separate chips.

In addition, the control unit 110, the storage unit 160, and the communication unit 170 have been described as being functionally distinguished, but the control unit 110, the storage unit 160, and the communication unit 170 are not necessarily distinguished physically.

For example, the control unit 110, the storage unit 160, and the communication unit 170 may be implemented as separate chips, or the control unit 110 and the storage unit 160 may be implemented as one chip, and the communication unit 170 may be implemented as another chip. Also, the control unit 110 and the communication unit 160 may be implemented as one chip, and the storage unit 160 may be implemented as another chip, or the control unit 110, the storage unit 160, and the communication unit 170 may be implemented as one integrated chip.

FIGS. 3 and 4 show operating modes of a communication part included in an electronic device according to an embodiment.

As described above, the electronic device 100 may operate in the first mode and the second mode.

In the first mode, the electronic device 100 may acquire information of the AP 10 from an external device such as the mobile terminal 200.

Identification information and authentication information of the specific AP 10 is required for the electronic device 100 to access the AP 10. However, the electronic device 100 may not include an input means for receiving identification information and authentication information of the AP 10 from a user. In other words, only predetermined control commands may be input to the button module 121 included in the electronic device 100, and it may be difficult for a user to input characters, numbers, signs, etc. to the button module 121.

For this reason, in the first mode, the electronic device 100 may receive identification information and authentication information of the AP 10 from an external device, such as the mobile terminal 200, through communication.

Also, the electronic device 100 may notify an external device of its presence to acquire identification information and authentication information of the AP 10 from the external device such as the mobile terminal 200.

Specifically, in the first mode, the electronic device 100 may broadcast an advertisement signal through the communication unit 170. In other words, in the first mode, the communication unit 170 may unilaterally send an advertisement signal to unspecified targets. Here, the advertisement signal may include identification information of the electronic device 100 for identifying the electronic device 100.

The advertisement signal may or may not be received by an external device. In other words, since a device which will receive the advertisement signal is not specified, there may or may not be a device receiving the advertisement signal.

An external device receiving the advertisement signal may transmit a communication request for requesting communication to the electronic device 100 as necessary. The electronic device 100 receiving the communication request of the external device may accept the communication request of the external device, and then communication may be established between the electronic device 100 and the external device.

For example, when the local area communication module 171 communicates according to a Wi-Fi communication standard, the local area communication module 171 may communicate in the 2.4 gigahertz (GHz) frequency band or the 5 GHz frequency band, and the first mode indicates an AP mode. The local area communication module 171 in the AP mode may broadcast an advertisement signal in the 2.4 GHz frequency band or the 5 GHz frequency band as shown in FIG. 3. Here, the advertisement signal may include an SSID of the electronic device 100.

When the mobile terminal 200 receives the advertisement signal of the electronic device 100, the mobile terminal 200 may transmit a communication request to the electronic device 100, and the electronic device 100 may respond to the communication request of the mobile terminal 200.

Subsequently, the electronic device 100 may request authentication from the mobile terminal 200, and the mobile terminal 200 may transmit authentication information to the electronic device 100 in response to the authentication request of the electronic device 100.

When the mobile terminal 200 is authenticated, communication is established between the electronic device 100 and the mobile terminal 200 according to the Wi-Fi communication standard.

After communication is established between the electronic device 100 and the mobile terminal 200 in this way, the electronic device 100 may acquire identification information and authentication information of the AP 10 from the mobile terminal 200.

In the second mode, the electronic device 100 may access the AP 10. Specifically, the electronic device 100 may access the AP 10 by using the identification information and the authentication information of the AP 10 acquired in the first mode.

To access the AP 10, the electronic device 100 may search for the AP 10.

Specifically, in the second mode, the electronic device 100 may search for an advertisement signal broadcast by an external device through the communication unit 170. In other words, in the second mode, the communication unit 170 may receive an advertisement signal sent to unspecified communication targets.

The electronic device 100 receiving an advertisement signal may transmit a communication request for requesting communication to the external device which has broadcast the advertisement signal. When the external device receiving the communication request of the electronic device 100 accepts the communication request, communication may be established between the electronic device 100 and the external device.

For example, when the local area communication module 171 communicates according to a Wi-Fi communication standard, the second mode indicates a station (STA) mode. The electronic device 100 in the STA mode may receive an advertisement signal broadcast by the AP 10 as shown in FIG. 4. Here, the advertisement signal may include an SSID of the AP 10.

The electronic device 100 receiving the advertisement signal may compare the SSID of the AP 10 included in the advertisement signal and the identification information acquired in the first mode. When the SSID of the AP 10 included in the advertisement signal coincides with the identification information acquired in the first mode, the electronic device 100 may transmit a communication request to the AP 10 which has broadcast the advertisement signal. Also, the AP 10 may respond to the communication request of the electronic device 100.

Subsequently, the AP 10 may request authentication from the electronic device 100, and the electronic device 100 may transmit the authentication information acquired in the first mode to the AP 10 in response to the authentication request of the AP 10.

When the electronic device 100 is authenticated, communication is established between the electronic device 100 and the AP 10 according to the Wi-Fi communication standard.

In this way, the electronic device 100 may access the AP 10 by using the identification information and the authentication information acquired from the mobile terminal 200.

In the first mode, the electronic device 100 may send an advertisement signal to acquire identification information and authentication information of the AP 10 from the mobile terminal 200. Also, in the second mode, the electronic device 100 may search for an advertisement signal of the AP 10 and access the AP 10 by using the identification information and the authentication information of the AP 10. As described above, the electronic device 100 may operate like a server which provides information in the first mode, and may operate like a client which accesses a server in the second mode.

In addition, the electronic device 100 may operate in any one of the first mode and the second mode. Specifically, when a control command of a user or a predetermined condition is satisfied, the electronic device 100 may switch from the first mode to the second mode or switch from the second mode to the first mode.

Further, the electronic device 100 may simultaneously operate in the first mode and the second mode. For example, a time period may be divided into predetermined intervals, and the electronic device 100 may alternately operate in the first mode and the second mode at the divided time intervals. In other words, the electronic device 100 may divide a time period into a first time interval a and second time interval, and may operate in the first mode during the first time interval and operate in the second mode during the second time interval.

Switching of the electronic device 100 between the first mode and the second mode will be described below.

FIG. 5A shows operation of an electronic device according to an embodiment. Operation 1000 of the electronic device 100 will be described with reference to FIG. 5A.

Power is supplied to the electronic device 100 (1010).

Power supply to the electronic device 100 may involve inserting a plug of the electronic device 100 into a socket to which utility power is supplied (referred to as "plug-in" below) or inputting a power supply command of a user (e.g., the user presses a power button) in a plug-in state. In other words, power may be supplied to the electronic device 100 when the electronic device 100 is plugged in or a user presses the power button in a plug-in state.

Subsequently, the electronic device 100 determines whether it is possible to access the AP 10 (1020).

As described above, the electronic device 100 may access the WAN via the AP 10 and exchange data with the server device 1. Accordingly, the electronic device 100 is required to access the AP 10 in order to exchange data with the server device 1.

Here, identification information and authentication information of the AP 10 is required for the electronic device 100 to access the AP 10.

The electronic device 100 may determine whether it is possible to access the AP 10 on the basis of whether identification information and authentication information of the AP 10 has been stored in the storage unit 160.

For example, when identification information and authentication information of the AP 10 has been stored in the storage unit 160, the electronic device 100 may determine that it is possible to access the AP 10.

On the other hand, when identification information and authentication information of the AP 10 has not been stored in the storage unit 160, the electronic device 100 may determine that it is not possible to access the AP 10.

When it is possible to access the AP 10 (Yes at 1020), the electronic device 100 operates in the second mode (1060).

When it is possible to access the AP 10, the electronic device 100 may operate in the second mode to search for the AP 10 to be accessed. In the second mode, the electronic device 100 may search for an advertisement signal broadcast by the AP 10. For example, in the STA mode, the electronic device 100 may search for an advertisement signal sent by the AP 10.

When the advertisement signal is found, the electronic device 100 may access the AP 10 by using the identification information and the authentication information stored in the storage unit 160. For example, when the advertisement signal is found, the electronic device 100 may compare an ID included in the advertisement signal and the identification information stored in the storage unit 160 and transmit a communication request to the AP 10 according to the comparison result.

Subsequently, the electronic device 10 may transmit the authentication information stored in the storage unit 160 to the AP 10 in response to an authentication request of the AP 10. When authentication is completed, the electronic device 100 is connected to the AP 10.

When it is not possible to access the AP 10 (No at 1020), the electronic device 100 operates in the first mode (1030).

When identification information and authentication information of the AP 10 has not been stored in the storage unit 160, the electronic device 100 may directly communicate with the mobile terminal 200 to acquire identification information and authentication information of the AP 10.

To directly communicate with the mobile terminal 200, the electronic device 100 may send an advertisement signal including information related to the electronic device 100. In other words, the electronic device 100 may unilaterally send an advertisement signal to unspecified targets.

For example, the electronic device 100 may operate in the AP mode according to a Wi-Fi communication standard, and may broadcast an advertisement signal in the AP mode. Here, the advertisement signal may include an SSID of the electronic device 100.

Subsequently, the electronic device 100 determines whether information of the AP 10 is acquired (1040).

When the advertisement signal of the electronic device 100 is received, the mobile terminal 200 may transmit a communication request for requesting communication to the electronic device 100. When the electronic device 100 accepts the communication request of the mobile terminal 200, which is an external device, communication may be established between the electronic device 100 and the external device.

After communication is established between the electronic device 100 and the mobile terminal 200, the electronic device 100 may receive the identification information and the authentication information of the AP 10 from the mobile terminal 200.

On the other hand, when there is not the mobile terminal 200 receiving the advertisement signal of the electronic device 100 or the mobile terminal 200 has not stored the identification information and the authentication information of the AP 10, the electronic device 100 may not acquire the identification information and the authentication information of the AP 10.

When the information of the AP 10 is acquired (Yes at 1040), the electronic device 100 switches from the first mode to the second mode (1060).

When the identification information and the authentication information of the AP 10 is acquired, the electronic device 100 may switch to the second mode to communicate with the AP 10 to be accessed. In the second mode, the electronic device 100 may search for an advertisement signal broadcast by the AP 10. For example, in the STA mode, the electronic device 100 may search for an advertisement signal sent by the AP 10.

When the advertisement signal is found, the electronic device 100 may access the AP 10 by using the identification information and the authentication information acquired from the mobile terminal 200. For example, when the advertisement signal is found, the electronic device 100 may compare an ID included in the advertisement signal and the identification information acquired from the mobile terminal 200 and transmit a communication request to the AP 10 according to the comparison result.

Subsequently, the electronic device 10 may transmit the authentication information acquired from the mobile terminal 200 to the AP 10 in response to an authentication request of the AP 10. When authentication is completed, the electronic device 100 is connected to the AP 10.

When the information of the AP 10 is not acquired (No at 1040), the electronic device 100 determines whether a waiting time for acquiring the information of the AP 10 is greater than a predetermined reference time (1050).

When the waiting time is not greater than the reference time (No at 1050), the electronic device 100 keeps operating in the first mode. In other words, the electronic device 100 keeps broadcasting the advertisement signal.

When the waiting time is greater than the reference time (Yes at 1050), the electronic device 100 switches to the second mode (1060).

When the mobile terminal 200 does not access the electronic device 100 within the reference time, it is possible to assume that the user does not want a service of the electronic device 100 through communication.

Accordingly, the electronic device 100 may finish the first mode and switch to the second mode in order to acquire identification information and authentication information of the AP 10.

At this time, the electronic device 100 have not acquired identification information and authentication information of the AP 10, and thus may not access the AP 10 in the second mode.

As described above, to acquire identification information and authentication information of the AP 10 from the mobile terminal 200, the electronic device 100 may output the advertisement signal in the first mode when it is plugged in or a power supply command is input. Also, to access the AP 10, the electronic device 100 may switch to the second mode.

Further, when identification information and authentication information of the AP 10 is not acquired within the predetermined time, the electronic device 100 may switch to the second mode.

FIG. 5B shows operation of an electronic device according to an embodiment. Operation 1800 of the electronic device 100 will be described with reference to FIG. 5B.

The electronic device 100 is plugged in (1810).

Here, plug-in means that the plug of the electronic device 100 is inserted into a socket to which utility power is supplied. Due to plug-in, power may be supplied to the electronic device 100.

When plugged in, the electronic device 100 operates in the first mode (1820).

To acquire identification information and authentication information of the AP 10, the electronic device 100 may directly communicate with the mobile terminal 200. To directly communicate with the mobile terminal 200, the electronic device 100 may send an advertisement signal including information related to the electronic device 100. In other words, the electronic device 100 may unilaterally send an advertisement signal to unspecified targets.

For example, the electronic device 100 may operate in the AP mode according to a Wi-Fi communication standard, and may broadcast an advertisement signal in the AP mode. Here, the advertisement signal may include an SSID of the electronic device 100.

Subsequently, the electronic device 100 determines whether information of the AP 10 is acquired (1830).

When the advertisement signal of the electronic device 100 is received, the mobile terminal 200 may transmit a communication request for requesting communication to the electronic device 100. When the electronic device 100 accepts the communication request of the mobile terminal 200, which is an external device, communication may be established between the electronic device 100 and the external device.

Subsequently, the electronic device 100 may receive identification information and authentication information of the AP 10 from the mobile terminal 200.

On the other hand, when there is not the mobile terminal 200 receiving the advertisement signal of the electronic device 100 or the mobile terminal 200 has not stored the identification information and the authentication information of the AP 10, the electronic device 100 may not receive the identification information and the authentication information of the AP 10.

When the information of the AP 10 is acquired (Yes at 1230), the electronic device 100 switches from the first mode to the second mode (1840).

When the identification information and the authentication information of the AP 10 is acquired, the electronic device 100 may switch to the second mode to communicate with the AP 10 to be accessed. In the second mode, the electronic device 100 may search for an advertisement signal broadcast by the AP 10. For example, in the STA mode, the electronic device 100 may search for an advertisement signal sent by the AP 10.

When the advertisement signal is found, the electronic device 100 may access the AP 10 by using the identification information and the authentication information acquired from the mobile terminal 200. For example, when the advertisement signal is found, the electronic device 100 may compare an ID included in the advertisement signal and the identification information acquired from the mobile terminal 200 and transmit a communication request to the AP 10 according to the comparison result.

When the information of the AP 10 is not acquired (No at 1230), the electronic device 100 keeps operating in the first mode. In other words, the electronic device 100 keeps broadcasting the advertisement signal.

In this way, when plugged in, the electronic device 100 may output the advertisement signal in the first mode until identification information and authentication information of the AP 10 is acquired.

A configuration and operation of an electronic device have been described above.

A configuration and operation of a mobile terminal will be described below.

FIG. 6 shows a configuration of a mobile terminal according to an embodiment.

As shown in FIG. 6, the mobile terminal 200 may include a user interface 220, a sensing unit 230, an audio unit 240, a video unit 250, a storage unit 260, a communication unit 270, and a control unit 210.

The user interface 220 may interact with a user. For example, the user interface 220 may receive a user input from a user and display information according to the user input.

The user interface 220 may include a button module 221 for receiving a predetermined user input from the user and a touchscreen module 222 for receiving a touch input of the user and displaying information corresponding to the received touch input.

The touchscreen module 222 may receive a touch input from the user and display an image corresponding to the received touch input.

The touchscreen module 222 may include a resistive touch panel, a capacitive touch panel, or the like to receive a touch input of the user, and may include an LCD panel, an LED panel, or the like to visually display information.

The sensing unit 230 may sense an external environment of the mobile terminal 200, an internal state of the mobile terminal 200, or the like.

The audio unit 240 may include a microphone 241 for receiving an audio signal and a speaker 242 for outputting an audio signal.

The video unit 250 may include a camera 251 for acquiring a forward or backward image of the mobile terminal 200. The camera 251 may include an image sensor for converting an optical signal into an electrical signal (video data).

The storage unit 260 may store a control program and control data for controlling operation of the mobile terminal 200 and various application programs and application data for performing various functions according to a user input.

For example, the storage unit 260 may store information on the electronic device 100 which is managed/controlled by the mobile terminal 200.

The storage unit 260 may include a non-volatile memory in which a program or data is not lost even when power is cut off. For example, the storage unit 260 may include a high-capacity flash memory, an SSD 261, or the like.

The communication unit 270 may include a local area communication module 271 capable of communicating with an external device in a local area and a mobile communication module 272 capable of communicating with an external device anywhere without spatial limitations.

The local area communication module 271 may exchange data with the electronic device 100 and/or the AP 10 by using wireless signals. In other words, the local area communication module 271 may transmit a wireless signal including transmission data to the electronic device 100 and/or the AP 10 and receive a wireless signal including reception data from the electronic device 100 and/or the AP 10.

The local area communication module 271 which wirelessly transmits and receives signals as described above may include an antenna for transmitting a wireless signal to free space or receiving a wireless signal from free space, a modulator/demodulator for modulating data to be transmitted or demodulating the received wireless signal, and the like.

A communication target of data and a communication target of a wireless signal may differ from each other. In other words, a target device to which a wireless signal is transmitted and a target device to which data is transmitted may differ from each other.

For example, the local area communication module 271 may wirelessly transmit a wireless signal to the AP 10. At this time, data included in the wireless signal may be transmitted to the server device 1 via the AP 10. Also, data transmitted from the server device 1 to the mobile terminal 200 may be modulated into a wireless signal by the AP 10, and the local area communication module 271 may receive the wireless signal including the data from the AP 10.

The local area communication module 271 may transmit a wireless signal to the AP 10 and receive a wireless signal from the AP by using a wireless communication standard, such as Wi-Fi™, Bluetooth™, Zigbee, or the like.

The mobile communication module 272 may exchange data with the base station ST (see FIG. 1) by using wireless signals. In other words, the mobile communication module 272 may transmit a wireless signal including transmission data to the base station ST (see FIG. 1) and receive a wireless signal including reception data from the base station ST (see FIG. 1).

Since base stations ST (see FIG. 1) are evenly distributed in an area in which a wireless communication service is provided, the communication between the mobile communication module 272 and the base stations ST (see FIG. 1) is not terminated in the area in which the wireless communication service is provided.

The mobile communication module 272 which performs wireless communication as described above may include an antenna for transmitting a wireless signal to free space or receiving a wireless signal from free space, a modulator/demodulator for modulating data to be transmitted or demodulating the received wireless signal, an encoder/decoder for encoding the data to be transmitted or decoding received data, and the like.

A communication target of data and a communication target of a wireless signal may differ from each other. In other words, a target device to which a wireless signal is transmitted and a target device to which data is transmitted may differ from each other.

For example, the mobile communication module 272 may wirelessly transmit a wireless signal to the base station ST (see FIG. 1). At this time, data included in the wireless signal may be transmitted to the server device 1 via the base station ST (see FIG. 1). Also, data transmitted from the server device 1 to the mobile terminal 200 may be modulated into a wireless signal by the base station ST (see FIG. 1), and the mobile communication module 272 may receive the wireless signal including the data from the base station ST (see FIG. 1).

The mobile communication module 272 may exchange wireless signals with the base station ST (see FIG. 1) by using a wireless communication standard, such as time-division multiple access (TDMA), code-division multiple access (CDMA), wideband code division multiple access (WCDMA), code-division multiple access 2000 (CDMA2000), wireless broadband (WiBro), world interoperability for microwave access (WiMAX), long term evolution (LTE), wireless broadband evolution (WiBro-EVO), or the like.

The control unit 210 may control operation of the above-described user interface 220, sensing unit 230, audio unit 240, video unit 250, storage unit 260, and communication unit 270.

For example, to exchange data with the electronic device 100, the control unit 210 may control the communication unit 270 so that the communication unit 270 exchanges wireless signals with the AP 10 or the base station ST (see FIG. 1).

The control unit 210 may include a processor 211 for performing computation for controlling operation of the mobile terminal 200, and a memory 212 for storing a program and data related to a computing operation of the processor 211.

According to the program stored in the memory 212, the processor 211 may load the data stored in the memory 212 and perform an arithmetic operation or a logical operation on the loaded data. Also, the processor 211 may output a result of the arithmetic operation or the logical operation to the memory 212.

The memory 212 may include a volatile memory which loses stored data when power supply is cut off.

The volatile memory may load a program and data from the above-described storage unit 260 and temporarily store the loaded data. Also, the volatile memory may provide the stored program and data to the processor 211 and store data output from the processor 211.

The volatile memory may include an S-RAM, a D-RAM, and the like.

Also, the memory 212 may include a non-volatile memory as necessary. The non-volatile memory may maintain stored data when power supply is cut off.

The non-volatile memory included in the memory 212 may store firmware for managing and initializing various components included in the mobile terminal 200.

The non-volatile memory may include a ROM, an EPROM, an EEPROM, a flash memory, and the like.

The processor 211 and the memory 212 have been described as being functionally distinguished, but the processor 211 and the memory 212 are not necessarily distinguished physically. For example, the processor 211 and the memory 212 may be implemented as one chip as well as separate chips.

In addition, the control unit 210, the storage unit 260, and the communication unit 270 have been described as being functionally distinguished, but the control unit 210, the storage unit 260, and the communication unit 270 are not necessarily distinguished physically.

For example, the control unit 210, the storage unit 260, and the communication unit 270 may be implemented as separate chips, or the control unit 210 and the storage unit 260 may be implemented as one chip, and the communication unit 270 may be implemented as another chip. Also, the control unit 210 and the communication unit 260 may be implemented as one chip, and the storage unit 260 may be implemented as another chip, or the control unit 210, the storage unit 260, and the communication unit 270 may be implemented as one integrated chip.

FIG. 7 shows operation of a mobile terminal according to an embodiment. Operation 1100 of the mobile terminal 200 will be described with reference to FIG. 7.

First, the mobile terminal 200 searches for the electronic device 100 (1110).

Specifically, the mobile terminal 200 may search for an advertisement signal broadcast by the electronic device 100.

As described above, the electronic device 100 may broadcast an advertisement signal in the first mode to acquire information of the AP 10 from the mobile terminal 200. At this time, the mobile terminal 200 may search for an advertisement signal of the electronic device 100 to provide information of the AP 10 to the electronic device 100.

The mobile terminal 200 may receive a wireless signal through the local area communication module 271 and restore data contained in the wireless signal by demodulating and decrypting the received wireless signal. Then, the mobile terminal 200 may determine whether the wireless signal is an advertisement signal broadcast by the electronic device 100 on the basis of the restored data.

Subsequently, the mobile terminal 200 determines whether the electronic device 100 has been found (1120).

The mobile terminal 200 may receive the wireless signal received through the local area communication module 271 and determine whether the received wireless signal is an advertisement signal of the electronic device 100. Specifically, the mobile terminal 200 may compare identification information of the electronic device 100 stored in the storage unit 260 and identification information included in the advertisement signal received through the local area communication module 271, and may determine that the electronic device 100 has been found when the two pieces of information coincide.

When the electronic device 100 is found (Yes at 1120), the mobile terminal 200 selects the electronic device 100 (1130).

When one electronic device 100 is found, the mobile terminal 200 may select the found electronic device 100. When a plurality of electronic devices are found, the mobile terminal 200 may select at least one electronic device 100 according to intensities of advertisement signals or a selection of a user.

A method in which the mobile terminal 200 selects at least one electronic device 100 from among a plurality of electronic devices will be described in detail below.

Subsequently, the mobile terminal 200 acquires information of the AP 10 (1140).

Specifically, the mobile terminal 200 may display a screen, in which a user may input identification information and authentication information of the AP 10, in the user interface 220, and may acquire identification information and authentication information of the AP 10 according to an input of the user. Alternatively, when the identification information and the authentication information of the AP 10 has been stored in the mobile terminal 200 (when the mobile terminal 200 has accessed the AP by inputting the identification information and the authentication information), the mobile terminal 200 may automatically load the identification information and the authentication information of the AP 10 from the storage unit 260. In this case, the identification information and the authentication information of the AP 10 may be automatically displayed in the user interface 220, and the user may confirm/correct the displayed identification information and authentication information.

Also, the mobile terminal 200 may access the AP 10 to confirm the identification information and the authentication information of the AP 10.

Subsequently, the mobile terminal 200 accesses the electronic device 100 (1150).

The mobile terminal 200 transmits a communication request to the electronic device 100, and communication between the mobile terminal 200 and the electronic device 100 is established when the electronic device 100 accepts the access.

Subsequently, the mobile terminal 200 transmits the information of the AP 10 to the electronic device 100 (1160).

The mobile terminal 200 may transmit the previously acquired identification information and authentication information of the AP 10 to the electronic device 100 through the local area communication module 271.

Subsequently, the mobile terminal 200 accesses the AP 10 (1170).

Specifically, the mobile terminal 200 may terminate communication with the electronic device 100 and search for the AP 10. In other words, the mobile terminal 200 may search for an advertisement signal broadcast by the AP 10.

The AP 10 broadcasts an advertisement signal to notify an external device of its presence. Therefore, the mobile terminal 200 may search for the advertisement signal broadcast by the AP 10.

The mobile terminal 200 may receive a wireless signal through the local area communication module 271 and restore data contained in the wireless signal by demodulating and decrypting the received wireless signal. Then, the mobile terminal 200 may determine whether the wireless signal is an advertisement signal broadcast by the AP 10 on the basis of the restored data.

Specifically, the mobile terminal 200 may compare identification information of the AP 10 stored in the storage unit 260 and information included in the advertisement signal received through the local area communication module 271, and may determine that the AP 10 has been found when the two pieces of information coincide.

When the AP 10 is found, the mobile terminal 200 transmits a communication request to the AP 10, and communication between the mobile terminal 200 and the AP 10 is established when the AP 10 accepts the access.

When the advertisement signal of the electronic device 100 is not found (No at 1120), the mobile terminal 200 accesses the AP 10 (1170).

Subsequently, the mobile terminal 200 communicates with the electronic device 100 via the AP 10 (1180).

As described above in the operation 1000 (FIG. 5) of the electronic device 100, the electronic device 100 acquiring the identification information and the authentication information of the AP 10 may access the AP 10.

The mobile terminal 200 may search for the electronic device 100 connected to the AP 10 and attempt to communicate with the electronic device 100.

For example, the mobile terminal 200 may request the AP 10 to search for connected devices. In response to the request of the mobile terminal 200, the AP 10 may search for connected devices and transmit a search result to the mobile terminal 200. The mobile terminal 10 may search for the electronic device 100 on the basis of the search result of the AP 10, and may request communication from the electronic device 100 via the AP 10 when the electronic device 100 is found.

In another example, the electronic device 100 connected to the AP 10 may transmit the advertisement signal to a device connected to the AP 10 via the AP 10. The mobile terminal 200 receiving the advertisement signal of the electronic device 100 may request communication from the electronic device 100 via the AP 10.

After communication with the electronic device 100 is established via the AP 10, the mobile terminal 200 may exchange various kinds of information with the electronic device 100 via the AP 10.

In this way, the mobile terminal 200 may provide the identification information and the authentication information of the AP 10 to the electronic device 100 through direction communication with the electronic device 100, and may communicate with the electronic device 100 via the AP 10.

In the above description, it is assumed that the mobile terminal 200 finds one electronic device 100, but the mobile terminal 200 may find a plurality of electronic devices 100.

FIGS. 8 to 11 show an example in which a mobile terminal selects at least one of a plurality of electronic devices according to an embodiment. Also, FIG. 12 shows an example in which a mobile terminal broadcasts information of an AP to a plurality of electronic devices according to an embodiment.

When an advertisement signal of the electronic device 100 is found, the mobile terminal 200 may acquire information of the AP 10 from a user or the storage unit 260 and transmit the information of the AP 10 to the electronic device 100.

Here, the plurality of electronic devices 100-1, 100-2, and 100-3 may simultaneously broadcast advertisement signals.

For example, as shown in FIG. 8, when the washing machine 100-1, the refrigerator 100-2, and the air conditioner 100-3 broadcast, respectively, first to third advertisement signals, the mobile terminal 200 may receive all the first to third advertisement signals.

When a plurality of beacon frames are received in this way, the mobile terminal 200 may select at least one electronic device 100 from among the plurality of electronic devices 100-1, 100-2, and 100-3 and transmit identification information and authentication information of the AP 10 to the selected electronic device 100.

For example, the mobile terminal 200 may access an electronic device 100 which has broadcast a beacon frame having the highest signal intensity among the received plurality of beacon frames, and may transmit the identification information and the authentication information of the AP 10 to the connected electronic device 100.

Specifically, when the plurality of beacon frames are received, the mobile terminal 200 may measure intensities of the plurality of beacon frames and select an electronic device which has transmitted an advertisement signal having the highest intensity. For example, when the third beacon frame has the highest intensity, the mobile terminal 200 may select the air conditioner 100-3.

Subsequently, as shown in FIG. 9, the mobile terminal 200 may display, in the touchscreen module 222, a first notification screen 222*a* including a message 222*aa* for notifying that the selected electronic device 100-3 has been found and an input region 222*ab* for inputting identification information and authentication information of the AP 10.

When identification information and authentication information of the AP 10 is input to the input region 222*ab* by the user, the mobile terminal 200 may transmit a communication request to the selected electronic device 100-3. Also, when identification information and authentication information has been stored in the mobile terminal 200, the identification information and the authentication information of the AP 10 may be automatically input to the input region 222*ab*.

Subsequently, when communication with the selected electronic device 100-3 is established, the mobile terminal 200 may transmit the identification information and the authentication information of the AP 10 to the selected electronic device 100-3.

In another example, the mobile terminal 200 may receive the user's selection of at least one of the plurality of electronic devices 100-1, 100-2, and 100-3, access the electronic device 100 selected by the user, and transmit the identification information and the authentication information of the AP 10.

Specifically, the mobile terminal 200 may identify each of the plurality of electronic devices 100-1, 100-2, and 100-3 on the basis of the received plurality of beacon frames.

Subsequently, as shown in FIG. 10, the mobile terminal 200 may display, in the touchscreen module 221, a second notification screen 221*b* including a message 222*ba* for requesting a selection of an electronic device to be accessed and an input region 222*bb* for selecting an electronic device 100-1, 100-2, or 100-3.

When the user selects any one of the plurality of electronic devices 100-1, 100-2, and 100-3, the mobile terminal 200 may display, in the touchscreen module 221, the first notification screen 222*a* including the input region 222*ab* for inputting identification information and authentication information of the AP 10 as shown in FIG. 9.

When the identification information and the authentication information of the AP 10 is input to the input region 222*ab* by the user, the mobile terminal 200 may transmit a communication request to the selected electronic device 100. Subsequently, when communication with the selected electronic device 100 is established, the mobile terminal 200 the air conditioner 100-3.

The user may select two or more electronic devices from among the plurality of electronic devices 100-1, 100-2, and 100-3. When two or more electronic devices are selected, the mobile terminal 200 may receive the identification information and the authentication information of the AP 10 from the user and sequentially transmit the identification information and the authentication information of the AP 10 to the selected two or more electronic devices.

In another example, the mobile terminal 200 may temporarily select an electronic device 100 which has broadcast a beacon frame having the highest signal intensity among the received plurality of beacon frames, and may enable the user to finally select an electronic device 100.

Specifically, when a plurality of beacon frames are received, the mobile terminal 200 may measure intensities of the plurality of beacon frames and select an electronic device which has transmitted a beacon frame having the highest intensity. For example, when the third beacon frame has the highest intensity, the mobile terminal 200 may temporarily select the air conditioner 100-3.

Subsequently, as shown in FIG. 11, the mobile terminal 200 may display, in the touchscreen module 221, a third notification screen 221*c* including a message 222*ca* for notifying that the selected electronic device 100-3 has been found, an input region 222*cb* for inputting identification information and authentication information of the AP 10, and a selection region 222*cc* for selecting another electronic device 100-1, 100-2, or 100-3.

When the identification information and the authentication information of the AP 10 is input to the input region 222*cb* by the user, the mobile terminal 200 may transmit a communication request to the selected electronic device 100-3, and may transmit the identification information and the authentication information of the AP 10 when communication with the air conditioner 100-3 is established.

On the other hand, when the selection region 222*cc* is selected by the user, the mobile terminal 200 may display, in the touchscreen module 222, the second notification screen 222*b* including the input region 222*bb* for selecting an electronic device 100-1, 100-2, or 100-3 as shown in FIG. 10.

When the user selects at least one of the plurality of electronic devices 100-1, 100-2, and 100-3, the mobile terminal 200 may display, in the touchscreen module 221, the third notification screen 221*c* including the input region 222*cb* for inputting identification information and authentication information of the AP 10 as shown in FIG. 11.

Subsequently, when the identification information and the authentication information of the AP 10 is input to the input region 222*cb* by the user, the mobile terminal 200 may transmit a communication request to the electronic device selected by the user. Then, when communication with the selected electronic device 100-2 is established, the mobile terminal 200 may transmit the identification information and the authentication information of the AP 10.

In still another example, when the beacon frames of the plurality of electronic devices 100-1, 100-2, and 100-3 are found, the mobile terminal 2000 may transmit the identification information and the authentication information of the AP to the plurality of electronic devices 100-1, 100-2, and 100-3 in a broadcast manner as shown in FIG. 12. Here, the identification information and the authentication information may be previously input by the user, or authentication information stored in the mobile terminal 200 may be automatically input.

As described above, when the advertisement signals of the plurality of electronic devices 100-1, 100-2, and 100-3 are found, the mobile terminal 200 may communicate with an electronic device 100 which has broadcast an advertisement signal having the highest intensity or an electronic device 100 selected by the user. Also, the mobile terminal 200 may broadcast information to all the plurality of electronic devices 100-1, 100-2, and 100-3.

Configurations and operation of an electronic device and a mobile terminal have been separately described above.

A connection operation between an electronic device and a mobile terminal will be described below.

FIG. 13 shows an example of a communication method of a home network system according to an embodiment, and FIG. 14 shows an electronic device acquiring information of an AP according to the communication method shown in FIG. 13.

A communication method 2000 between the electronic device 100 and a first mobile terminal 200a will be described with reference to FIGS. 13 and 14.

Independently of operation of the first mobile terminal 200a, an advertisement signal of the electronic device 100 is broadcast (2005).

When a power supply command is input by a user, the electronic device 100 may operate in the first mode. In the first mode, the electronic device 100 may broadcast the advertisement signal, which includes information on the electronic device 100. For example, the electronic device 100 may operate in the AP mode according to a Wi-Fi communication standard, and may broadcast the advertisement signal in the AP mode. Here, the advertisement signal may include an SSID of the electronic device 100.

Independently of operation of the electronic device 100, the first mobile terminal 200a logs into the server device 1 (2010).

When a specific condition is satisfied, the first mobile terminal 200a may access the server device 1. For example, when the user turns on power of the first mobile terminal 200a or runs a specific application, the first mobile terminal 200a may access the server device 1.

After accessing the server device 1, the first mobile terminal 200a may log into the server device 1. For example, the first mobile terminal 200a may transmit account information and authentication information of the user to the server device 1 and acquire an access token for receiving a service of the server device 1.

After logging into the server device 1, the first mobile terminal 200a may exchange various kinds of information with the server device 1. For example, the first mobile terminal 200a may request information of the electronic device 100 registered with the server device 1 and receive a universal unique identifier (UUID), a name, etc. of the electronic device 100 from the server device 1. Also, the first mobile terminal 200a may request account information of the user from the server device 1 and receive the account information (e.g., an account id.) of the user from the server device 1.

Subsequently, the first mobile terminal 200a searches for the electronic device 100 (2020).

The first mobile terminal 200a may search for an advertisement signal broadcast by the electronic device 100 in the first mode. Specifically, the first mobile terminal 200a may receive a wireless signal through the local area communication module 271 and determine whether the received wireless signal is an advertisement signal transmitted by the electronic device 100.

Since the electronic device 100 broadcasts the advertisement signal in the first mode, the first mobile terminal 200a may receive the advertisement signal broadcast by the electronic device 100.

Subsequently, the first mobile terminal 200a selects the electronic device 100 (2030).

When one electronic device 100 is found, the first mobile terminal 200a may select the found electronic device 100. When a plurality of electronic devices are found, the first mobile terminal 200a may select at least one electronic device 100 according to intensities of advertisement signals or a selection of the user.

Subsequently, the first mobile terminal 200a acquires information of the AP 10 (2040).

Specifically, the first mobile terminal 200a may display a screen, in which the user may input identification information and authentication information of the AP 10, in the user interface 220, and may acquire identification information and authentication information of the AP 10 according to an input of the user. Alternatively, when the identification information and the authentication information of the AP 10 has been stored in the first mobile terminal 200a (when the user has accessed the AP by inputting the identification information and the authentication information), the first mobile terminal 200a may automatically load the identification information and the authentication information of the AP 10 from the storage unit 260. In this case, the identification information and the authentication information of the AP 10 may be automatically displayed in the user interface 220, and the user may confirm/correct the displayed identification information and authentication information.

Also, the first mobile terminal 200a may access the AP 10 to confirm the identification information and the authentication information of the AP 10.

Subsequently, local communication between the first mobile terminal 200a and the electronic device 100 is established (2050).

The first mobile terminal 200a may transmit a communication request to the electronic device 100 on the basis of the advertisement signal of the electronic device 100. Also, the electronic device 100 may respond to the communication request of the first mobile terminal 200a. When the electronic device 100 accepts the communication request of the first mobile terminal 200a, communication between the electronic device 100 and the first mobile terminal 200a is established.

Subsequently, the information of the AP 10 is transmitted from the first mobile terminal 200a to the electronic device 100 (2060).

The first mobile terminal 200a may transmit the identification information and the authentication information of the AP 10 acquired from the user to the electronic device 100.

For example, as shown in FIG. 14, the first mobile terminal 200a may transmit the identification information and the authentication information of the AP 10 to the electronic device 100 by using the local area communication module 271, and the electronic device 100 may receive the identification information and the authentication information of the AP 10 from the first mobile terminal 200a by using the local area communication module 171.

Subsequently, information of the first mobile terminal 200a is transmitted from the first mobile terminal 200a to the electronic device 100 (2070).

The electronic device 100 may request information of the first mobile terminal 200a from the first mobile terminal 200a, and the first mobile terminal 200a may transmit a UUID, a name, etc. thereof in response to the request of the electronic device 100.

Subsequently, information of the electronic device 100 is transmitted from the electronic device 100 to the first mobile terminal 200a (2080).

The first mobile terminal 200a may request the information of the electronic device 100 from the electronic device 100, and the electronic device 100 may transmit a UUID, a name, etc. thereof in response to the request of the first mobile terminal 200a.

Subsequently, the communication between the electronic device 100 and the first mobile terminal 200a is terminated (2090).

The electronic device 100 acquiring the identification information and the authentication information of the AP 10 may terminate the communication with the first mobile terminal 200a to access the AP 10. Also, the first mobile terminal 200a may terminate the communication with the electronic device 100 to access the AP 10.

As described above, the electronic device 100 may broadcast an advertisement signal to acquire information of the AP 10, and the first mobile terminal 200a may transmit the information of the AP 10 to the electronic device 100 when the advertisement signal of the electronic device 100 is found.

Operation of each of the electronic device 100 and the first mobile terminal 200a will be described below according to the communication method of a home network system shown in FIG. 13.

FIG. 15 shows an example of a communication method 1200 of an electronic device according to an embodiment.

Referring to FIG. 15, the electronic device 100 operates in the first mode (1210).

When power is supplied, the electronic device 100 may operate in the first mode. For example, when the electronic device 100 is plugged in and supplied with power or a user presses a power button in a plug-in state, the electronic device 100 may operate in the first mode. For example, the electronic device 100 may operate in the AP mode according to a Wi-Fi communication standard.

In the first mode, the electronic device 100 broadcasts an advertisement signal (1220).

In the first mode, the electronic device 100 may broadcast the advertisement signal at predetermined time intervals to communicate with the first mobile terminal 200a. Here, the advertisement signal may include information related to the electronic device 100 to notify the presence of the electronic device 100.

For example, when the electronic device 100 communicates according to a Wi-Fi communication standard, the electronic device 100 may operate in the AP mode. In the AP mode, the electronic device 100 may broadcast the advertisement signal. Here, the advertisement signal may include an SSID of the electronic device 100.

Subsequently, the electronic device 100 receives a communication request (1230).

While transmitting the advertisement signal, the electronic device 100 may receive a communication request transmitted by the first mobile terminal 200a.

Subsequently, the electronic device 100 establishes communication with the first mobile terminal 200a (1240).

The electronic device 100 may accept the communication request of the first mobile terminal 200a, and communication between the electronic device 100 and the first mobile terminal 200a is established by the acceptance of the electronic device 100.

In some cases, the electronic device 100 may request authentication information (e.g., a password) from the first mobile terminal 200a, and communication between the electronic device 100 and the first mobile terminal 200a may be established when authentication of the first mobile terminal 200a is completed.

Subsequently, the electronic device 100 receives information of the AP 10 from the first mobile terminal 200a (1250).

After communication with the first mobile terminal 200a is established, the electronic device 100 may receive identification information and authentication information of the AP 10 from the first mobile terminal 200a.

Subsequently, the electronic device 100 receives information of the first mobile terminal 200a from the first mobile terminal 200a (1260).

The electronic device 100 may request information related to the first mobile terminal 200a from the first mobile terminal 200a. Subsequently, the electronic device 100 may receive a UUID, a name, etc. of the first mobile terminal 200a from the first mobile terminal 200a.

The electronic device 100 may register the first mobile terminal 200a as a remote control device on the basis of the information on the first mobile terminal 200a.

Subsequently, the electronic device 100 transmits information of the electronic device 100 to the first mobile terminal 200a (1270).

In response to a request of the first mobile terminal 200a, the electronic device 100 may transmit a UUID, a name, etc. of the electronic device 100.

Subsequently, the electronic device 100 terminates the communication with the first mobile terminal 200a (1280).

The electronic device 100 acquiring the identification information and the authentication information of the AP 10 may access the AP 10 and terminate the communication with the first mobile terminal 200a to communicate with the server device 1 via the AP 10.

Subsequently, the electronic device 100 operates in the second mode (1290).

In the second mode, the electronic device 100 may search for an advertisement signal broadcast by the AP 10 by using the identification information of the AP 10 and may access the AP 10 by using the authentication information of the AP 10. For example, when the electronic device 100 communicates according to a Wi-Fi communication standard, the electronic device 100 may operate in the STA mode. In the STA mode, the electronic device 100 may access the AP 10.

FIG. 16 shows an example of a communication method 1300 of a mobile terminal according to an embodiment.

Referring to FIG. 16, the first mobile terminal 200a logs into the server device 1 (1310).

When a predetermined condition is satisfied, the first mobile terminal 200a may access the server device 1. For example, when power is turned on or an application for controlling the electronic device 100 is executed, the first mobile terminal 200a may access the server device 1.

After accessing the server device 1, the first mobile terminal 200a may log into the server device 1. For example, the first mobile terminal 200a may transmit account information and authentication information of a user to the server device 1 and acquire an access token for receiving a service of the server device 1.

Subsequently, the first mobile terminal 200a searches for the electronic device 100 (1320).

Specifically, the first mobile terminal 200a may search for an advertisement signal broadcast by the electronic device 100 in the first mode. For example, the first mobile terminal 200a may receive a wireless signal through the local area communication module 271 and determine whether the received wireless signal is an advertisement signal transmitted by the electronic device 100.

When the electronic device 100 in the first mode broadcasts an advertisement signal, the first mobile terminal 200a may receive the advertisement signal of the electronic device 100.

When the advertisement signal of the electronic device 100 is received, the first mobile terminal 200a acquires information of the AP 10 (1330).

Specifically, the first mobile terminal 200a may display a screen, in which the user may input identification information and authentication information of the AP 10, in the user interface 220, and may acquire identification information and authentication information of the AP 10 according to an input of the user. Alternatively, when the identification information and the authentication information of the AP 10 has been stored in the first mobile terminal 200a (when the user has accessed the AP by inputting the identification information and the authentication information), the first mobile terminal 200a may automatically load the identification information and the authentication information of the AP 10 from the storage unit 260. In this case, the identification information and the authentication information of the AP 10 may be automatically displayed in the user interface 220, and the user may confirm/correct the displayed identification information and authentication information.

Also, the first mobile terminal 200a may access the AP 10 to confirm the identification information and the authentication information of the AP 10.

Subsequently, the first mobile terminal 200a transmits a communication request to the electronic device 100 (1340).

The first mobile terminal 200a may transmit the communication request to the electronic device 100 on the basis of the advertisement signal of the electronic device 100. The advertisement signal may include an SSID of the electronic device 100. As a result, the first mobile terminal 200a may identify the electronic device 100 on the basis of the SSID of the electronic device 100 and transmit the communication request to the identified electronic device 100.

Subsequently, the first mobile terminal 200a establishes communication with the electronic device 100 (1350).

The electronic device 100 may accept the communication request of the first mobile terminal 200a, and communication between the electronic device 100 and the first mobile terminal 200a is established by the acceptance of the electronic device 100.

In some cases, the electronic device 100 may request authentication information (e.g., a password) from the first mobile terminal 200a, and communication between the electronic device 100 and the first mobile terminal 200a may be established when authentication of the first mobile terminal 200a is completed.

Subsequently, the first mobile terminal 200a transmits information of the AP 10 to the electronic device 100 (1360).

After communication with the electronic device 100 is established, the first mobile terminal 200a may transmit the identification information and the authentication information of the AP 10 input by the user to the electronic device 100.

Subsequently, the first mobile terminal 200a transmits information of the first mobile terminal 200a to the electronic device 100 (1370).

After receiving the identification information and the authentication information of the AP 10, the first mobile terminal 200a may transmit a UUID, a name, etc. of the first mobile terminal 200a to the electronic device 100 in response to a request of the electronic device 100.

Subsequently, the first mobile terminal 200a receives information of the electronic device 100 from the electronic device 100 (1380).

The first mobile terminal 200a may request information related to the electronic device 100 from the electronic device 100. Then, the first mobile terminal 200a may receive a UUID, a name, etc. of the electronic device 100 from the electronic device 100.

The first mobile terminal 200a may register the electronic device 100 as a control target device on the basis of the information on the electronic device 100.

Subsequently, the first mobile terminal 200a terminates the communication with electronic device 100 (1390).

The first mobile terminal 200a which has provided the identification information and the authentication information of the AP 10 to the electronic device 100 may terminate the communication with the electronic device 100 so that the electronic device 100 may access the AP 10.

Subsequently, the first mobile terminal 200a may search for an advertisement signal broadcast by the AP 10 by using the identification information of the AP 10 and access the AP 10 by using the authentication information of the AP 10.

Communication performed between the electronic device 100 and the first mobile terminal 200a via the AP 10 will be described below.

FIG. 17 shows an example of a communication method of a home network system according to an embodiment, and FIG. 18 shows an electronic device and a mobile terminal which communicate together according to the communication method shown in FIG. 17.

A communication method 2100 between the electronic device 100 and the first mobile terminal 200a will be described with reference to FIGS. 17 and 18.

Independently of operation of the first mobile terminal 200a, the electronic device 100 accesses the AP 10 (2105).

In the second mode, the electronic device 100 may access the AP 10 by using identification information and authentication information of the AP 10 acquired from the first mobile terminal 200a.

For example, according to a Wi-Fi communication standard, the electronic device 100 may receive an advertisement signal of the AP 10 in the STA mode. Here, the advertisement signal may include an SSID of the AP 10.

The electronic device 100 may identify the AP 10 by comparing the SSID included in the received advertisement signal and the identification information of the AP 10.

Also, when the advertisement signal of the AP 10 is received, the electronic device 100 may transmit a communication request to the AP 10 and transmit the authentication information in response to an authentication request of the AP 10.

When authentication of the electronic device 100 is completed, the electronic device 100 may communicate with the AP 10. Further, the electronic device 100 may access the WAN via the AP 10 and communicate with the server device 1.

Independently of operation of the electronic device 100, the first mobile terminal 200*a* also accesses the AP 10 (2110).

The first mobile terminal 200*a* may access the AP 10 by using identification information and authentication information of the AP 10 acquired from an input of a user.

For example, the first mobile terminal 200*a* may receive the advertisement signal of the AP 10 according to the Wi-Fi communication standard. Here, the advertisement signal may include the SSID of the AP 10.

The first mobile terminal 200*a* may identify the AP 10 by comparing the SSID included in the received advertisement signal and the identification information of the AP 10.

Also, when the advertisement signal of the AP 10 is received, the first mobile terminal 200*a* may transmit a communication request to the AP 10 and transmit the authentication information in response to an authentication request of the AP 10.

When authentication of the first mobile terminal 200*a* is completed, the first mobile terminal 200*a* may communicate with the AP 10. Further, the first mobile terminal 200*a* may access the WAN via the AP 10 and communicate with the server device 1.

Subsequently, communication between the electronic device 100 and the first mobile terminal 200*a* is established via the AP 10 (2120).

The electronic device 100 and the first mobile terminal 200*a* may ascertain each other in various ways.

For example, as shown in FIG. 18, the electronic device 100 may transmit an advertisement message to all devices connected to the AP 10 by using a service discovery protocol (e.g., a simple service discovery protocol (SSDP)), and the first mobile terminal 200*a* may respond to the advertisement signal of the electronic device 100.

In another example, the first mobile terminal 200*a* may transmit a search message to all the devices connected to the AP 10 by using a service discovery protocol, and the electronic device 100 may respond to the search message of the first mobile terminal 200*a*.

Subsequently, the first mobile terminal 200*a* may request peer-to-peer (P2P) connection via the AP 10 from the electronic device 100, or the electronic device 100 may request P2P connection via the AP 10 from the first mobile terminal 200*a*. When the P2P connection request is accepted, communication between the electronic device 100 and the first mobile terminal 200*a* is established via the AP 10.

Subsequently, the first mobile terminal 200*a* requests a control token from the electronic device 100 via the AP 10 (2130).

The control token denotes the right to control the electronic device 100. When the control token is acquired, the first mobile terminal 200*a* may transmit a control command to the electronic device 100, and the electronic device 100 may operate according to the control command of the first mobile terminal 200*a*.

The electronic device 100 receiving the control token request performs user authentication (2140).

The electronic device 100 may request a user input from the user to determine whether a valid user has requested the control token of the electronic device 100 through the first mobile terminal 200*a*. In other words, the electronic device 100 may request a user input from the user to prevent a person other than the valid user from controlling the electronic device 100 with the first mobile terminal 200*a*. For example, the electronic device 100 may request the user to press any one of the plurality of buttons included in the input unit 120. The user input request may be displayed in the display unit 130 of the electronic device 100 or displayed in the user interface 220 of the first mobile terminal 200*a*.

The user may make a user input in response to the user input request of the electronic device 100, and the user authentication is completed when the user input made by the user coincides with a predetermined user input.

When the user authentication succeeds, the electronic device 100 transmits the control token to the first mobile terminal 200*a* via the AP 10 (2150).

The first mobile terminal 200*a* acquiring the control token may control operation of the electronic device 100.

Subsequently, the first mobile terminal 200*a* transmits login information for the server device 1 to the electronic device 100 via the AP 10 (2160).

The electronic device 100 which has provided the control token may request login information for the server device 1 from the first mobile terminal 200*a*, and the first mobile terminal 200*a* may request an authentication code from the server device 1 in response to the login information request of the electronic device 100. When an authentication code is received from the server device 1, the first mobile terminal 200*a* may transmit user account information and the authentication code received from the server device 1 to the electronic device 100.

Subsequently, the electronic device 100 logs into the server device 1 (2170).

The electronic device 100 logs into the server device 1 by using the user account information and the authentication code received from the first mobile terminal 200*a*, and registers the electronic device 100 in the user account. In other words, the electronic device 100 may be added to the list of devices which may be controlled by the user with the first mobile terminal 200*a*.

As described above, the electronic device 100 may authenticate the user of the first mobile terminal 200*a* through a user input and register the electronic device 100 with the server device 1.

Operation of each of the electronic device 100 and the first mobile terminal 200*a* will be described below according to the communication method of a home network system shown in FIG. 17.

FIG. 19 shows an example of a communication method 1400 of an electronic device according to an embodiment.

Referring to FIG. 19, the electronic device 100 operates in the second mode (1410).

The electronic device 100 acquiring identification information and authentication information of the AP 10 from the first mobile terminal 200*a* may operate in the second mode.

In the second mode, the electronic device 100 may search for an advertisement signal of the AP 10. For example, according to a Wi-Fi communication standard, the electronic device 100 may search for an advertisement signal of the AP 10 in the STA mode.

Subsequently, the electronic device 100 accesses the AP 10 (1420).

In the second mode, the electronic device 100 may receive an advertisement signal of the AP 10. For example, the electronic device 100 may receive an advertisement signal of the AP 10, which may include an SSID of the AP 10.

The electronic device 100 may identify the AP 10 by comparing the SSID included in the advertisement signal and the identification information of the AP 10.

Also, when the advertisement signal of the AP 10 is received, the electronic device 100 may transmit a communication request to the AP 10, and transmit the authentication information in response to an authentication request of the AP 10. When the electronic device 100 is authenticated, the electronic device 100 may communicate with the AP 10.

Subsequently, the electronic device 100 establishes communication with the first mobile terminal 200a (1430).

The electronic device 100 may communicate with the first mobile terminal 200a via the AP 10.

For example, the electronic device 100 may transmit an advertisement message to all devices connected to the AP 10 by using a service discovery protocol.

When the first mobile terminal 200a responds to the advertisement signal of the electronic device 100, the electronic device 100 may request P2P connection via the AP 10 from the first mobile terminal 200a. When the P2P connection request is accepted, communication between the electronic device 100 and the first mobile terminal 200a is established via the AP 10.

Subsequently, the electronic device 100 receives a control token request from the first mobile terminal 200a (1440).

A control token denotes the right to control the electronic device 100, and the electronic device 100 may operate according to a control command received from a device having the control token.

Subsequently, the electronic device 100 requests a predetermined user input (1450).

The electronic device 100 may request a user input from a user to determine whether a valid user has requested the control token of the electronic device 100 through the first mobile terminal 200a. In other words, the electronic device 100 may request a user input from the user to prevent a person other than the valid user from controlling the electronic device 100 with the first mobile terminal 200a. The user input request may be displayed in the display unit 130 of the electronic device 100 or displayed in the user interface 220 of the first mobile terminal 200a.

Subsequently, the electronic device 100 performs user authentication (1460).

Specifically, the electronic device 100 may determine whether a user input made by the user coincides with the predetermined user input.

When the user authentication fails (No at 1460), the electronic device 100 may request a user input again.

When the user authentication succeeds (Yes at 1460), the electronic device 100 transmits the control token to the first mobile terminal 200a via the AP 10 (1470).

As a result, the electronic device 100 may operate according to a control command of the first mobile terminal 200a having the control token.

Subsequently, the electronic device 100 receives login information for the server device 1 from the first mobile terminal 200a (1480).

The electronic device 100 may request login information for the server device 1 from the first mobile terminal 200a, and the first mobile terminal 200a may transmit user account information and an authentication code to the electronic device 100 in response to the login information request of the electronic device 100.

Subsequently, the electronic device 100 logs into the server device 1 (1490).

The electronic device 100 logs into the server device 1 by using the user account information and the authentication code received from the first mobile terminal 200a, and registers the electronic device 100 in the user account. In other words, the electronic device 100 may be added to the list of devices which may be controlled by the user with the first mobile terminal 200a.

FIG. 20 shows an example of a communication method 1500 of a mobile terminal according to an embodiment.

Referring to FIG. 20, the first mobile terminal 200a accesses the AP 10 (1510).

The first mobile terminal 200a may receive an advertisement signal of the AP 10. For example, the electronic device 100 may receive an advertisement signal of the AP 10, which may include an SSID of the AP 10.

The first mobile terminal 200a may identify the AP 10 by comparing the SSID included in the advertisement signal and identification information of the AP 10.

Also, when the advertisement signal of the AP 10 is received, the first mobile terminal 200a may transmit a communication request to the AP 10, and transmit authentication information in response to an authentication request of the AP 10. When the authentication succeeds, the first mobile terminal 200a may communicate with the AP 10.

Subsequently, the first mobile terminal 200a establishes communication with the electronic device 100 (1520).

The first mobile terminal 200a may communicate with the electronic device 100 via the AP 10.

For example, the electronic device 100 may transmit an advertisement message to all devices connected to the AP 10 by using a service discovery protocol.

When the first mobile terminal 200a responds to the advertisement signal of the electronic device 100, the electronic device 100 may request P2P connection via the AP 10 from the first mobile terminal 200a. When the P2P connection request is accepted, communication between the electronic device 100 and the first mobile terminal 200a is established via the AP 10.

Subsequently, the first mobile terminal 200a requests a control token from the electronic device 100 (1530).

The control token denotes the right to control the electronic device 100, and the electronic device 100 may operate according to a control command received from a device having the control token.

Subsequently, the first mobile terminal 200a receives the control token from the electronic device 100 (1540).

The electronic device 100 receiving the control token request may perform user authentication through a user input, and transmit the control token to the first mobile terminal 200a when the user authentication succeeds.

The first mobile terminal 200a transmits login information for the server device 1 to the electronic device 100 (1550).

The electronic device 100 which has provided the control token may request login information for the server device 1 from the first mobile terminal 200a.

The first mobile terminal 200a may request an authentication code from the server device 1 in response to the login information request of the electronic device 100, and may receive an authentication code from the server device 1.

Subsequently, the first mobile terminal 200a may transmit user account information and the authentication code received from the server device 1 to the electronic device 100. The electronic device 100 may log into the server device 1 by using the user account information and the authentication code.

After the electronic device 100 logs into the server device 1, the first mobile terminal 200a may acquire server registration information of the electronic device 100 from the electronic device 100.

As described above, the electronic device 100 may provide the control token to the first mobile terminal 200a and register the electronic device 100 with the server device 1 by using the login information received from the first mobile terminal 200a.

When the electronic device 100 is registered in the user account of the server device 1, the user may input a control command for the electronic device 100 by using the first mobile terminal 200a, and the control command may be transmitted to the electronic device 100 via the first mobile terminal 200a and the server device 1. As a result, the user may control the electronic device 100 by using the first mobile terminal 200a anywhere.

Communication between an electronic device which is not connected to an AP and a mobile terminal has been described above.

Communication between an electronic device which is connected to an AP and a mobile terminal will be described below.

FIG. 21 shows an example of a communication method of a home network system according to an embodiment, and FIG. 22 shows an electronic device and a mobile terminal which communicate together according to the communication method shown in FIG. 21.

A communication method 2200 between the electronic device 100 and a second mobile terminal 200b will be described with reference to FIGS. 21 and 22.

Here, the second mobile terminal 200b may be a terminal other than the first mobile terminal 200a (see FIGS. 13 and 17) of the above communication methods 2000 and 2100 (see FIGS. 13 and 17). Therefore, the second mobile terminal 200b may acquire a control token of the electronic device 100, and the electronic device 100 may register the electronic device 100 in a user account, so that a user may control the electronic device 100 by using the second mobile terminal 200b.

Independently of operation of the second mobile terminal 200b, the electronic device 100 accesses the AP 10 (2205).

As described in the above communication method 2000 (see FIG. 13), the electronic device 100 may acquire identification information and authentication information of the AP 10 and store the acquired identification information and authentication information in the storage unit 160.

Once the identification information and the authentication information of the AP 10 is acquired, the electronic device 100 may constantly access the AP 10 by using the acquired identification information and authentication information of the AP 10. In other words, when the identification information and the authentication information of the AP 10 is acquired, the electronic device 100 may not acquire again the identification information and the authentication information of the AP 10 from the second mobile terminal 200b. However, when the AP 10 is replaced or the identification information and the authentication information of the AP 10 is changed, the electronic device 100 may acquire again identification information and authentication information of the AP from the second mobile terminal 200b.

Therefore, the electronic device 100 which has previously acquired the identification information and the authentication information of the AP 10 may search for an advertisement signal of the AP 10 in the second mode and access the AP 10 by using the previously stored identification information and authentication information of the AP 10.

Independently of operation of the electronic device 100, the second mobile terminal 200b logs into the server device 1 (2210).

When a specific condition is satisfied, the second mobile terminal 200b may access the server device 1. For example, when the user turns on power of the second mobile terminal 200b or runs a specific application, the second mobile terminal 200b may access the server device 1.

After accessing the server device 1, the second mobile terminal 200b may log into the server device 1. For example, the second mobile terminal 200b may transmit account information and authentication information of the user to the server device 1 and acquire an access token for receiving a service of the server device 1.

After logging into the server device 1, the second mobile terminal 200b may exchange various kinds of information with the server device 1. For example, the second mobile terminal 200b may request information of the electronic device 100 from the server device 1 and receive a UUID, a name, etc. of the electronic device 100 from the server device 1. Also, the second mobile terminal 200b may request information of the user from the server device 1 and receive the account information of the user from the server device 1.

Subsequently, the second mobile terminal 200b searches for the electronic device 100 (2220).

The second mobile terminal 200b may search for an advertisement signal broadcast by the electronic device 100 in the first mode. Specifically, the first mobile terminal 200a may receive a wireless signal through the local area communication module 271 and determine whether the received wireless signal is an advertisement signal transmitted by the electronic device 100.

The electronic device 100 in the second mode is connected to the AP 10, and the second mobile terminal 200b is not able to receive the advertisement signal broadcast by the electronic device 100.

When the advertisement signal of the electronic device 100 is not received, the second mobile terminal 200b accesses the AP 10 (2230).

When the electronic device 100 has already accessed the AP 10, the second mobile terminal 200b may attempt to access the AP 10 without providing again the identification information and the authentication information of the AP 10 to the electronic device 100.

The second mobile terminal 200b may access the AP 10 by using the identification information and the authentication information of the AP 10.

For example, the second mobile terminal 200b may receive the advertisement signal of the AP 10 according to a Wi-Fi communication standard. Here, the advertisement signal may include an SSID of the AP 10.

The second mobile terminal 200b may identify the AP 10 by comparing the SSID included in the received advertisement signal and the identification information of the AP 10.

Also, when the advertisement signal of the AP 10 is received, the second mobile terminal 200b may transmit a communication request to the AP 10 and transmit the authentication information in response to an authentication request of the AP 10.

When the authentication of the second mobile terminal 200b succeeds, the second mobile terminal 200b may communicate with the AP 10. Further, the second mobile terminal 200b may access the WAN via the AP 10 and communicate with the server device 1.

Subsequently, communication between the electronic device 100 and the second mobile terminal 200b is established via the AP 10 (2240).

The electronic device 100 and the second mobile terminal 200*b* may ascertain each other in various ways.

For example, as shown in FIG. 22, the second mobile terminal 200*b* may transmit a search message to all devices connected to the AP 10 by using a service discovery protocol, and the electronic device 100 may respond to the search message of the second mobile terminal 200*b*.

Subsequently, the second mobile terminal 200*b* may request P2P connection via the AP 10 from the electronic device 100, or the electronic device 100 may request P2P connection via the AP 10 from the second mobile terminal 200*a*. When the P2P connection request is accepted, communication between the electronic device 100 and the second mobile terminal 200*b* is established via the AP 10.

Subsequently, the second mobile terminal 200*b* requests a control token from the electronic device 100 via the AP 10 (2250).

The control token denotes the right to control the electronic device 100. When the control token is acquired, the second mobile terminal 200*b* may transmit a control command to the electronic device 100, and the electronic device 100 may operate according to the control command of the second mobile terminal 200*b*.

The electronic device 100 receiving the control token request determines whether a predetermined user input is made (2260).

The electronic device 100 may request a user input from the user to determine whether a valid user has requested the control token of the electronic device 100 through the second mobile terminal 200*b*. In other words, the electronic device 100 may request a user input from the user to prevent a person other than the valid user from controlling the electronic device 100 with the second mobile terminal 200*b*. The user input request may be displayed in the display unit 130 of the electronic device 100 or displayed in the user interface 220 of the second mobile terminal 200*b*.

The user may make a user input in response to the user input request of the electronic device 100, and user authentication is completed when the user input made by the user coincides with the predetermined user input.

When the user authentication succeeds, the electronic device 100 transmits the control token to the first mobile terminal 200*a* via the AP 10 (2270).

The second mobile terminal 200*b* acquiring the control token may control operation of the electronic device 100.

Subsequently, the second mobile terminal 200*b* transmits login information for the server device 1 to the electronic device 100 via the AP 10 (2280).

The electronic device 100 which has provided the control token may request login information for the server device 1 from the second mobile terminal 200*b*, and the second mobile terminal 200*b* may request an authentication code from the server device 1 in response to the login information request of the electronic device 100. When an authentication code is received from the server device 1, the second mobile terminal 200*b* may transmit user account information and the authentication code received from the server device 1 to the electronic device 100.

Subsequently, the electronic device 100 logs into the server device 1 (2290).

The electronic device 100 logs into the server device 1 by using the user account information and the authentication code received from the first mobile terminal 200*a*, and registers the electronic device 100 in the user account. In other words, the electronic device 100 may be added to the list of devices which may be controlled by the user with the second mobile terminal 200*b*.

As described above, the electronic device 100 may authenticate the user of the second mobile terminal 200*b* through a user input and register the electronic device 100 in the user account of the server device 1.

In particular, when the electronic device 100 has previously acquired identification information and authentication information of the AP 10 and already accessed the AP 10, the second mobile terminal 200*b* does not provide again the identification information and the authentication information of the AP 10 to the electronic device 100.

As a result, when the electronic device 100 has already accessed the AP 10, it is possible to minimize a time period in which the second mobile terminal 200*b* registers the electronic device 100 with the server device 1.

Operation of each of the electronic device 100 and the second mobile terminal 200*b* will be described below according to the communication method of a home network system shown in FIG. 21.

FIG. 23 shows an example of a communication method 1600 of an electronic device according to an embodiment.

Referring to FIG. 19, the electronic device 100 operates in the second mode (1610).

The electronic device 100 which has previously acquired identification information and authentication information of the AP 10 may operate in the second mode.

In the second mode, the electronic device 100 may search for an advertisement signal of the AP 10. For example, according to a Wi-Fi communication standard, the electronic device 100 may search for an advertisement signal of the AP 10 in the STA mode.

Subsequently, the electronic device 100 accesses the AP 10 (1620).

In the second mode, the electronic device 100 may receive an advertisement signal of the AP 10. Here, the advertisement signal may include an SSID of the AP 10.

The electronic device 100 may identify the AP 10 by comparing the SSID included in the advertisement signal and the identification information of the AP 10.

Also, when the advertisement signal of the AP 10 is received, the electronic device 100 may transmit a communication request to the AP 10, and transmit the authentication information in response to an authentication request of the AP 10. When the electronic device 100 is authenticated, the electronic device 100 may communicate with the AP 10.

Subsequently, the electronic device 100 establishes communication with the second mobile terminal 200*b* (1630).

The electronic device 100 may communicate with the second mobile terminal 200*b* via the AP 10.

For example, when the second mobile terminal 200*b* transmits a search message to the electronic device 100 by using a service discovery protocol, the electronic device 100 may respond to the search message of the second mobile terminal 200*b*.

Also, when the second mobile terminal 200*b* requests P2P connection via the AP 10 from the electronic device 100, the electronic device 100 may accept the P2P connection. As a result, communication between the electronic device 100 and the second mobile terminal 200*b* is established via the AP 10.

Subsequently, the electronic device 100 receives a control token request from the second mobile terminal 200*b* (1640).

A control token denotes the right to control the electronic device 100, and the electronic device 100 may operate according to a control command received from a device having the control token.

Subsequently, the electronic device 100 requests a predetermined user input (1650).

The electronic device 100 may request a user input from a user to determine whether a valid user has requested the control token of the electronic device 100 through the second mobile terminal 200*b*. In other words, the electronic device 100 may request a user input from the user to prevent a person other than the valid user from controlling the electronic device 100 with the second mobile terminal 200*b*. The user input request may be displayed in the display unit 130 of the electronic device 100 or displayed in the user interface 220 of the second mobile terminal 200*b*.

Subsequently, the electronic device 100 performs user authentication (1660).

Specifically, the electronic device 100 may determine whether a user input made by the user coincides with the predetermined user input.

When the user authentication fails (No at 1660), the electronic device 100 may request a user input again.

When the user authentication succeeds (Yes at 1660), the electronic device 100 transmits the control token to the second mobile terminal 200*b* via the AP 10 (1670).

As a result, the electronic device 100 may operate according to a control command of the second mobile terminal 200*b* having the control token.

Subsequently, the electronic device 100 receives login information for the server device 1 from the second mobile terminal 200*b* (1680).

The electronic device 100 may request login information for the server device 1 from the second mobile terminal 200*b*, and the second mobile terminal 200*b* may transmit user account information and an authentication code to the electronic device 100 in response to the login information request of the electronic device 100.

Subsequently, the electronic device 100 logs into the server device 1 (1690).

The electronic device 100 logs into the server device 1 by using the user account information and the authentication code received from the second mobile terminal 200*b*, and registers the electronic device 100 in the user account. In other words, the electronic device 100 may be added to the list of devices which may be controlled by the user with the second mobile terminal 200*b*.

FIG. 24 shows an example of a communication method 1700 of a mobile terminal according to an embodiment.

Referring to FIG. 24, the second mobile terminal 200*b* logs into the server device 1 (1710).

When a predetermined condition is satisfied, the second mobile terminal 200*b* may access the server device 1. For example, when power is turned on or an application for controlling the electronic device 100 is executed, the second mobile terminal 200*b* may access the server device 1.

After accessing the server device 1, the second mobile terminal 200*b* may log into the server device 1. For example, the second mobile terminal 200*b* may transmit account information and authentication information of a user to the server device 1 and acquire an access token for receiving a service of the server device 1.

Subsequently, the second mobile terminal 200*b* searches for the electronic device 100 (1720).

Specifically, the second mobile terminal 200*b* may search for an advertisement signal broadcast by the electronic device 100 in the first mode.

However, when the electronic device 100 has already accessed the AP 100, the second mobile terminal 200*b* may not receive an advertisement signal of the electronic device 100.

When the advertisement signal of the electronic device 100 is not received, the second mobile terminal 200*b* accesses the AP 10 (1730).

The second mobile terminal 200*b* may receive an advertisement signal of the AP 10. For example, the electronic device 100 may receive an advertisement signal of the AP 10, which may include an SSID of the AP 10.

The second mobile terminal 200*b* may identify the AP 10 by comparing the SSID included in the advertisement signal and identification information of the AP 10.

Also, when the advertisement signal of the AP 10 is received, the second mobile terminal 200*b* may transmit a communication request to the AP 10, and transmit authentication information in response to an authentication request of the AP 10. When the authentication succeeds, the second mobile terminal 200*b* may communicate with the AP 10.

Subsequently, the second mobile terminal 200*b* establishes communication with the electronic device 100 (1740).

The second mobile terminal 200*b* may communicate with the electronic device 100 via the AP 10.

For example, the second mobile terminal 200*b* may transmit a search message to the electronic device 100 by using a service discovery protocol.

When the electronic device 100 responds to the search message of the second mobile terminal 200*b*, the second mobile terminal 200*b* may request P2P connection via the AP 10 from the electronic device 100. When the electronic device 100 accepts the P2P connection, communication between the electronic device 100 and the second mobile terminal 200*b* is established via the AP 10.

Subsequently, the second mobile terminal 200*b* requests a control token from the electronic device 100 (1750).

The control token denotes the right to control the electronic device 100, and the electronic device 100 may operate according to a control command received from a device having the control token.

Subsequently, the second mobile terminal 200*b* receives the control token from the electronic device 100 (1760).

The electronic device 100 receiving the control token request may perform user authentication through a user input, and transmit the control token to the second mobile terminal 200*b* when the user authentication succeeds.

The second mobile terminal 200*b* transmits login information for the server device 1 to the electronic device 100 (1770).

The electronic device 100 which has provided the control token may request login information for the server device 1 from the second mobile terminal 200*b*.

The second mobile terminal 200*b* may request an authentication code from the server device 1 in response to the login information request of the electronic device 100, and may receive an authentication code from the server device 1.

Subsequently, the second mobile terminal 200*b* may transmit user account information and the authentication code received from the server device 1 to the electronic device 100. The electronic device 100 may log into the server device 1 by using the user account information and the authentication code.

After the electronic device 100 logs into the server device 1, the second mobile terminal 200*b* may acquire server registration information of the electronic device 100 from the electronic device 100.

A home network system including one server device has been described above.

A home network system including a plurality of server devices will be described below.

FIG. 25 shows an example of a communication method of a home network system according to an embodiment.

Referring to FIG. 25, a home network system may include the AP 10, the electronic device 100, the first mobile terminal 200a, a first server 1a, a second server 1b, and a third server 1c.

Since the AP 10, the electronic device 100, and the first mobile terminal 200a have been described above, description thereof will be omitted.

Each of the first server 1a, the second server 1b, and the third server 1c may provide a service, manage user accounts, and connect the electronic device 100 and the first mobile terminal 200a. For example, the first server 1a may provide a service to the electronic device 100 and the first mobile terminal 200a. The second server 1b may manage information of user accounts and information of devices registered in the user accounts. The third server 1c may manage a network address of the electronic device 100 and a network address of the first mobile terminal 200a.

When server devices are distinguished by function in this way, functional scalability and security may be improved.

According to a communication method 3000 of a home network system, the first mobile terminal 200a logs into the second server 1b (3005). When a user turns on power of the first mobile terminal 200a or runs a specific application, the first mobile terminal 200a may access and log into the second server 1b. Here, the second server 1b may manage the information of user accounts and the information of devices registered in the user accounts.

Subsequently, the first mobile terminal 200a requests information of the electronic device 100 from the second server 1b (3010), and receives a UUID, a name, etc. of the electronic device 100 from the second server 1b (3015).

Subsequently, the first mobile terminal 200a requests account information of the user from the second server 1b (3020), and receives account information of the user from the second server 1b (3025).

Subsequently, the first mobile terminal 200a searches for an advertisement signal (3030). Independently of operation of the first mobile terminal 200a, the electronic device 100 may broadcast an advertisement signal in the first mode, and the advertisement signal may include an SSID of the electronic device 100. Therefore, the first mobile terminal 200a may receive the advertisement signal broadcast by the electronic device 100.

Subsequently, the first mobile terminal 200a selects the electronic device 100 and acquires information of the AP 10 (3040). The first mobile terminal 200a may display, in the user interface 220, a screen in which the user may input identification information and authentication information of the AP 10, and may acquire identification information and authentication information of the AP 10 according to an input of the user. Alternatively, when the identification information and the authentication information of the AP 10 has been stored in the first mobile terminal 200a (when the user has accessed the AP by inputting the identification information and the authentication information), the first mobile terminal 200a may automatically load the identification information and the authentication information of the AP 10 from the storage unit 260. In this case, the identification information and the authentication information of the AP 10 may be automatically displayed in the user interface 220, and the user may confirm/correct the displayed identification information and authentication information.

Subsequently, the first mobile terminal 200a confirms the identification information and the authentication information of the AP 10 (3045). The first mobile terminal 200a may attempt to access the AP 10 by using the identification information and the authentication information of the AP 10.

Subsequently, local communication between the first mobile terminal 200a and the electronic device 100 is established (3050). When the first mobile terminal 200a requests communication from the electronic device 100 and the electronic device 100 accepts the communication request, communication between the electronic device 100 and the first mobile terminal 200a is established.

Subsequently, information of the AP 10 is transmitted from the first mobile terminal 200a to the electronic device 100 (3055). The first mobile terminal 200a may transmit the identification information and the authentication information of the AP 10 acquired from the user to the electronic device 100.

Subsequently, the electronic device 100 requests information of the first mobile terminal 200a from the first mobile terminal 200a (3060), and the first mobile terminal 200a transmits a UUID, a name, etc. of the first mobile terminal 200a (3065).

Subsequently, the first mobile terminal 200a requests information of the electronic device 100 from the electronic device 100 (3070), and the electronic device 100 transmits the UUID, the name, etc. of the electronic device 100 to the first mobile terminal 200a (3075).

Subsequently, the communication between the electronic device 100 and the first mobile terminal 200a is terminated (3080). The electronic device 100 acquiring the identification information and the authentication information of the AP 10 may terminate the communication with first mobile terminal 200a to access the AP 10.

As described above, the electronic device 100 may broadcast an advertisement signal to acquire information of the AP 10, and the first mobile terminal 200a may transmit information on the AP 10 to the electronic device 100 when the advertisement signal of the electronic device 100 is found.

FIG. 26 shows an example of a communication method of a home network system according to an embodiment.

According to a communication method 3100 of a home network system shown in FIG. 26, the electronic device 100 accesses the AP 10 (3105). In the second mode, the electronic device 100 may access the AP 10 by using identification information and authentication information of the AP 10 acquired from the first mobile terminal 200a.

The first mobile terminal 200a also accesses the AP 10 (3110). The first mobile terminal 200a may access the AP 10 by using the identification information and the authentication information of the AP 10 acquired from an input of a user.

Subsequently, communication between the electronic device 100 and the first mobile terminal 200a is established via the AP 10 (3115). The electronic device 100 may transmit an advertisement message to all devices connected to the AP 10 by using a service discovery protocol, and the first mobile terminal 200a may respond to the advertisement signal of the electronic device 100. Then, communication between the electronic device 100 and the first mobile terminal 200a is established via the AP 10.

Subsequently, the first mobile terminal 200a requests a control token from the electronic device 100 via the AP 10 (3120). Here, the control token denotes the right to control the electronic device 100.

Subsequently, the electronic device 100 performs user authentication (3125). The electronic device 100 may request a user input from the user to determine whether a valid user has requested the control token of the electronic device 100 through the first mobile terminal 200*a*. When the user input of the use coincides with a predetermined user input, the user authentication is completed.

Subsequently, the electronic device 100 transmits the control token to the first mobile terminal 200*a* (3130). The first mobile terminal 200*a* acquiring the control token may control operation of the electronic device 100.

Subsequently, the electronic device 100 requests user account information from the first mobile terminal 200*a* (3135).

In response to the request of the electronic device 100, the first mobile terminal 200*a* requests an authentication code from the second server 1*b* (3140), and receives an authentication code from the second server 1*b* (3145).

Subsequently, the first mobile terminal 200*a* transmits a user account ID and an authentication code to the electronic device 100 (3150).

Subsequently, the electronic device 100 logs into the second server 1*b* (3155). The electronic device 100 logs into the server device 1 by using the user account information and the authentication code received from the first mobile terminal 200*a*, and registers the electronic device 100 in the user account.

Subsequently, the first mobile terminal 200*a* requests the first server 1*a* to register the electronic device 100 (3160). Here, the first server 1*a* may interpret control commands of the first mobile terminal 200*a* and transmit the interpreted control commands to the electronic device 100. Although the electronic device 100 has been previously registered with the second server 1*b*, it is necessary to additionally register the electronic device 100 with the first server 1*a* and the third server 1*c*. Therefore, the first mobile terminal 200*a* requests the first server 1*a* to register the electronic device 100, and transmits information (a UUID and the like) for registration of the electronic device 100 to the first server 1*a*.

Subsequently, the first mobile terminal 200*a* acquires account information (a peer ID and a peer group ID) for registering the electronic device 100 with the third server 1*c* (3165). Here, the third server 1*c* may store a network address of the first mobile terminal 200*a* and a network address of the electronic device 100, and connect the first mobile terminal 200*a* and the electronic device 100 in a network.

Subsequently, the first mobile terminal 200*a* requests registration with the third server 1*c* from the electronic device 100*a* and transmits the account information for registration with the third server 1*c* (3170).

Subsequently, the electronic device 100 logs into the third server 1*c* by using the account information for registration with the third server 1*c* and registers the network address of the electronic device 100 (3175).

As described above, the electronic device 100 may authenticate the user of the first mobile terminal 200*a* through a user input and register the electronic device 100 with the first, second, and third servers 1*a*, 1*b*, and 1*c*.

FIG. 27 shows an example of a communication method of a home network system according to an embodiment.

According to a communication method 3200 of a home network system shown in FIG. 27, the second mobile terminal 200*b* logs into the second server 1*b* (3205). Here, the second mobile terminal 200*b* may be a terminal other than the first mobile terminal 200*a* (see FIGS. 25 and 26) of the above communication methods 3000 and 3100 (see FIGS. 25 and 26). When a user turns on power of the second mobile terminal 200*b* or the user runs a specific application, the second mobile terminal 200*b* may access the second server 1*b*.

Subsequently, the second mobile terminal 200*b* requests information of the electronic device 100 from the second server 1*b* (3210), and receives a UUID, a name, etc. of the electronic device 100 from the second server 1*b* (3215).

Subsequently, the second mobile terminal 200*b* requests account information of the user from the second server 1*b* (3220), and receives account information of the user from the second server 1*b* (3225).

Subsequently, the first mobile terminal 200*a* searches for an advertisement signal (3230). Independently of operation of the first mobile terminal 200*a*, the electronic device 100 may access the AP 10 in the second mode. Therefore, the second mobile terminal 200*b* may not receive an advertisement signal broadcast by the electronic device 100.

Subsequently, the second mobile terminal 200*b* accesses the AP 10 (3235). The second mobile terminal 200*b* may access the AP 10 by using previously stored identification information and authentication information of the AP 10.

Subsequently, communication between the electronic device 100 and the first mobile terminal 200*a* is established via the AP 10 (3240). The second mobile terminal 200*b* may transmit a search message to all devices connected to the AP 10 by using a service discovery protocol, and the electronic device 100 may respond to the search message of the second mobile terminal 200*b*. Subsequently, communication between the electronic device 100 and the second mobile terminal 200*b* is established via the AP 10.

Subsequently, the second mobile terminal 200*b* requests a control token from the electronic device 100 via the AP 10 (3245). Here, the control token denotes the right to control the electronic device 100.

Subsequently, the electronic device 100 performs user authentication (3250). The electronic device 100 may request a user input from the user to determine whether a valid user has requested the control token of the electronic device 100 through the second mobile terminal 200*b*. When a user input of the user coincides with a predetermined user input, the user authentication is completed.

Subsequently, the electronic device 100 transmits the control token to the second mobile terminal 200*b* (3255). The second mobile terminal 200*b* acquiring the control token may control operation of the electronic device 100.

Subsequently, the electronic device 100 requests user account information from the second mobile terminal 200*b* (3260).

In response to the request of the electronic device 100, the second mobile terminal 200*b* requests an authentication code from the second server 1*b* (3265), and receives an authentication code from the second server 1*b* (3270).

Subsequently, the second mobile terminal 200*b* transmits a user account ID and the authentication code to the electronic device 100 (3275).

Subsequently, the electronic device 100 logs into the second server 1*b* (3280). The electronic device 100 logs into the server device 1 by using the user account information and the authentication code received from the second mobile terminal 200*b*, and registers the electronic device 100 in the user account.

Subsequently, the second mobile terminal 200*b* requests the first server 1*a* to register the electronic device 100 (3285). Although the electronic device 100 has been previously registered with the second server 1*b*, it is necessary to additionally register the electronic device 100 with the first server 1*a* and the third server 1*c*. Therefore, the second mobile terminal 200*b* requests the first server 1*a* to register the electronic device 100, and transmits information (a UUID and the like) for registration of the electronic device 100 to the first server 1a.

Subsequently, the second mobile terminal 200b acquires account information for registering the electronic device 100 with the third server 1c (3290).

Subsequently, the second mobile terminal 200b requests registration with the third server 1c from the electronic device 100a and transmits the account information for registration with the third server 1c (3295).

Subsequently, the electronic device 100 logs into the third server 1c by using the account information for registration with the third server 1c and registers the network address of the electronic device 100 (3300).

As described above, the electronic device 100 may authenticate the user of the second mobile terminal 200b through a user input and register the electronic device 100 in the user account of the server device 1.

In particular, when the electronic device 100 has previously acquired identification information and authentication information of the AP 10 and already accessed the AP 10, the second mobile terminal 200b does not provide again the identification information and the authentication information of the AP 10 to the electronic device 100.

As a result, when the electronic device 100 has already accessed the AP 10, it is possible to minimize a time period in which the second mobile terminal 200b registers the electronic device 100 with the server device 1.

Meanwhile, the disclosed embodiments can be implemented as recording media storing computer-executable instructions. The instructions can be stored in the form of a program code, and generate, when executed by a processor, a program module such that operation of the disclosed embodiments can be performed. The recording media can be implemented as computer-readable recording media.

The computer-readable recording media include all kinds of recording media in which instructions that can be interpreted by a computer are stored. Examples of the computer-readable recording media include a ROM, a RAM, a magnetic tape, a magnetic disc, a flash memory, an optical data storage device, and the like.

The embodiments have been described above with reference to the accompanying drawings. Those of ordinary skill in the art to which the present invention pertains will appreciate that the present invention can be carried out in forms different from the disclosed embodiments without changing the technical spirit or essential characteristics of the present invention. The disclosed embodiments are exemplary and should not be interpreted as restrictive.

The invention claimed is:

1. An electronic device comprising:
a storage;
a transceiver; and
a processor configured to:
in response to power being supplied to the electronic device, identify whether access information of an access point (AP) is stored in the storage,
in response to identifying that the access information of the AP is not stored in the storage, operate in a first mode in which the transceiver outputs an advertisement signal and receives the access information of the AP from an external device,
based on the access information of the AP being received while operating in the first mode within a predetermined reference time after the power is supplied, operate in a second mode in which the transceiver searches for an advertisement signal of the AP and access the AP based on the access information of the AP, and
based on determining that the predetermined reference time has elapsed after the power is supplied terminate the operating in the first mode.

2. The electronic device of claim 1, wherein the processor is further configured to, based on the electronic device being connected to the AP, transmit a control token to a mobile terminal via the AP.

3. The electronic device of claim 2, wherein the processor is further configured to:
request a user input for user authentication when a transmission request for the control token is received from the mobile terminal, and
transmit the control token to the mobile terminal when a user input made by a user coincides with a predetermined user input.

4. The electronic device of claim 1, wherein the advertisement signal includes a service set identifier (SSID) of the electronic device.

5. The electronic device of claim 1, wherein the processor is further configured to:
in response to acquiring the access information of the AP, stop outputting the advertisement signal and access the AP based on the access information of the AP, and
in response to a time elapsed after the power is supplied without acquiring the access information of the AP being greater than the predetermined reference time, stop outputting the advertisement signal.

6. The electronic device of claim 1, wherein the processor is further configured to:
receive a communication request of the external device while outputting the advertisement signal,
in response to receiving the communication request of the external device, establish communication with the external device, and
after establishing communication with the external device, receive the access information of the AP from the external device.

7. The electronic device of claim 6, wherein the processor is further configured to:
receive identification information of the external device from the external device, and
transmit identification information of the electronic device to the external device.

8. The electronic device of claim 6,
wherein the access information of the AP includes identification information of the AP and authentication information of the AP, and
wherein the processor is further configured to:
search for the advertisement signal of the AP by using the identification information of the AP, and
in response to the advertisement signal of the AP being found, access the AP by using the authentication information of the AP.

9. The electronic device of claim 1, wherein the processor is further configured to, in response to the electronic device being plugged into a power supply or a power supply command being input to the electronic device, output the advertisement signal while operating in the first mode.

* * * * *